United States Patent [19]

Furr, Jr.

[11] 4,198,681

[45] Apr. 15, 1980

[54] SEGMENTED STORAGE LOGGING AND CONTROLLING FOR PARTIAL ENTITY SELECTION AND CONDENSING

[75] Inventor: Glynn R. Furr, Jr., Austin, Tex.

[73] Assignee: International Business Machines Corporation, Armonk, N.Y.

[21] Appl. No.: 762,370

[22] Filed: Jan. 25, 1977

[51] Int. Cl.² ............................................. G06F 13/06
[52] U.S. Cl. .................................................. 364/900
[58] Field of Search ... 364/200 MS File, 900 MS File, 364/200, 900

[56] References Cited

U.S. PATENT DOCUMENTS

| 3,241,125 | 3/1966 | Tomasulo et al. | 364/900 |
|---|---|---|---|
| 3,693,159 | 9/1972 | Hilberg | 364/900 |
| 3,760,376 | 9/1973 | Tanner | 364/900 |
| 3,805,252 | 4/1974 | Morris et al. | 364/200 |
| 3,824,551 | 7/1974 | Arciprete et al. | 364/900 |

Primary Examiner—Leo H. Boudreau
Attorney, Agent, or Firm—Douglas H. Lefeve; J. B. Kraft

[57] ABSTRACT

A system and method are disclosed for controlling text storage in a text processing system using a segmented, serial bulk storage device. A plurality of storage segments of equal length are further subdivided into portions of equal length. A typical page of text occupies more than one portion of a segment. During system operation a log or directory is built and written, in updated form, onto a portion of the storage after any text data is written onto the storage. As many portions of a page on the storage as there are corresponding whole integer portions in the text processing system memory are transferred to the memory when an entity is selected for transfer from the storage device to the memory. The provision is also made to continue transferring the remaining portions of a page to the text processing system memory when room becomes available in the text processing system memory for inclusion of this text data. Finally a technique for condensing the text data on the storage by removal of the numerous unused portions of segment that may appear during an extensive revision of a text processing job is disclosed.

6 Claims, 22 Drawing Figures

SEGMENTED STORAGE LOGGING AND CONTROLLING FOR PARTIAL ENTITY SELECTION AND CONDENSING

CROSS-REFERENCE TO RELATED APPLICATIONS

U.S. patent application Ser. No. 762,379, filed Jan. 25, 1977, having Gavin L. Douglas as inventor and entitled, "Segmented Storage Logging and Controlling", assigned to the assignee of this application.

U.S. patent application Ser. No. 762,375, filed Jan. 25, 1977, having William C. Cason, et al as inventors and entitled, "Segmented Storage Logging and Controlling For Random Entity Selection", assigned to the assignee of this application.

BACKGROUND OF THE INVENTION

1. Field of the Invention

This invention relates generally to segmented storage logging and controlling and more particularly to a system and method for the efficient maintenance of segments and segment portions of a segmented serial storage device for the reading and writing of text pages thereon.

2. Description of the Prior Art

Described in U.S. Pat. Nos. 3,753,239 and 3,781,813 is a technique for logging the utilization of storage blocks on a serial bulk memory and assigning blocks for the storage of new and revised text pages to eliminate the burden to a text processing system operator of having to keep track of the logical sequence of storage blocks that correspond to pages of a document being prepared or revised. The log was recorded onto a block at the beginning of the memory at the completion of each storage or deletion operation.

The above-referenced patents fail to address the possibility in which a page is recalled for storage in the text processing system when sufficient memory capacity does not exist in the system for storage of the entire page. In such a situation, it would be very advantageous to the operator to be able to recall that portion of the page that could be accommodated by the text processing system memory.

Also, in the above-referenced system each block of the storage corresponded to a page of text. Each block had to accommodate a normal page of text. Thus, if the pages of a job were short, much unused tape storage area resulted.

In an attempt to provide denser utilization of a bulk storage, consideration has been given toward further subdividing blocks or segments into portions. Thus, if each block were segmented into eight portions and a page were allowed to start at any portion boundary, up to eight short pages could be included on a block. A much more sophisticated logging system is required than that taught in the above patents, however, because in the patents the beginning of each block denoted the beginning of a page. In the contemplated improvement of segmenting the blocks, several situations can exist. The first portion of a block may be the beginning of, or the middle of, a page. In fact, any portion on a block might begin a page, but no data is recorded along with the portion to reflect this fact.

In the contemplated system described in the preceding paragraph a system design constraint was that once a page is begun on a block it must be continued, on that block, physically, until the end of the page or the end of that block. If it was necessary to continue into another block, this was allowed without requiring a pagination break to take place. However, numerous scattered portions of blocks are opened during text revision that cannot otherwise be used for later recording because of text that exists on subsequent portions of those blocks that cannot be written over. Thus, it is evident that an efficient means to compress the stored text on the storage blocks is desirable to, thereby, condense the used storage area on the bulk storage device without requiring a condensation buffer of substantial size.

It would, therefore, be advantageous to provide a segmented bulk storage logging and controlling system and method which overcomes the above shortcomings of the prior art to provide increased utilization of the storage capability of the storage device due to improved controlling techniques.

SUMMARY OF THE INVENTION

Accordingly, a system and method are provided for storing and retrieving text entities for support of a text processing machine. These text entities, normally representing pages of a document, are stored as a series of unlabeled, variable sized members on segments of a serial bulk storage device. By unlabeled it is meant that no page number or any other logging data is embedded in the text. The system attempts to maximize the unused storage space by packing the entities onto the storage segments.

The storage is one in which the data is transferred in a serial manner from or to a segment of storage, but that segment of storage may be accessed to a "portion" level in a random or pseudo-random manner. All segments are of fixed and equal length. Thus, each segment contains a plurality of portions with each of the portions being of fixed and equal length.

Since the data is stored in a serial, unlabeled format, the entity (page) number of any stored text cannot be determined only by inspection of the stored text itself. Instead, the system maintains a directory which allows it to ascertain both entity numbers and the locations of these entities on the storage device. This log (directory) is comprised of two sections: (1) a system list which is a list of the *logical* order of the storage segments utilized and (2) the system log which is a log of the data characteristics of every storage segment in the storage.

The system attempts to pack entities onto segments of storage, but not necessarily onto physically contiguous segments. An entity may cross storage segments and the set of storage segments in the system list represents a set of entities (e.g., a multi-page document). The system list is a *logical* rather than a physical list of storage segments. Consider the hypothetical list of storage segments: f/m/d/e. Segment "f" both physically and logically precedes segment "m". Segment "m" logically, but not physically, precedes segment "d". The two segments "d" and "e" are physically contiguous although the two segments "m", "d" and the two segments "f", "m" are not. Any combination of contiguous, non-contiguous, physically preceding, or following are possible in this list. The list implies the *logical* order in which the data is stored.

In the example, "m" is said to "trail" segment "f" and segment "d" is said to trail segment "m". Segment "d" does not trail segment "f". No segment trails segment "e". Segment "m" is said to "lead" segment "d" and segment "f" leads segment "m". Segment "f" does not lead segment "d". No segment leads segment "f".

The system log of storage segment data characteristics is a record of how every portion of every segment is currently used by the system. Each portion of a segment will have one and only one of the following data characteristics attributed to it in the log, as follows: (1) unused-available, (2) error-unusable, (3) data only, or (4) data and entity begin. A data entity (page) may span several portions of a storage segment or several storage segments. No more than one data entity may exist on a portion. When a data entity spans several storage segments, they are adjacent in the system list. When the entity spans portions of a segment, those portions are serially located on the storage segment. A single entity is delimited by an entity bein characteristic in the system log and by a succeeding entity begin characteristic or the end of the system list. Portions on which no text is stored (error-unusable, unused-available) existing between entity begins have no effect. The number of a data entity (page number) is determined by the relative position of the entity begin in the system list (as determined from the system log). For example, entity number 3 is located by finding the third entity begin through inspection of the system list and the system log of characteristics. As another example, the retrieval of any entity numbered "i" is performed by locating the storage segment containing the "i$^{th}$" entity begin and reading the correct portion and any subsequent "data only" portions on that segment or subsequent segments in the system list until (1) another ("i+1") entity begin portion is located or (2) the list ends. "Unused" and "error-unusable" portions are skipped.

When the text processing system (user) randomly selects an entity, that entity is subject to revision by the user. Consequently, the entity may be physically enlarged by text addition such that it will no longer fit into the space it previously occupied on the storage device. If the logical end of this entity shares a storage segment with the next higher entity number, a possible problem exists. Because of this possible conflict, the system will relocate any data trailing the end of the selected entity that shares that segment, if the conflicting data exists. This conflicting data is relocated prior to the initial reading of the requested entity and is done via the random access memory buffer which will hold the requested data. This data is relocated onto another segment which is not initially included in the system list or system log. The relocated data will not be logged unless: (1) it is actually required after the originally requested, revised data has been stored back onto the storage, or (2) or unless errors occur in attempting to store the requested data on the segment from which it originally came, or (3) if the entity subsequent to the originally requested entity is also selected. If the data cannot be relocated, the fetch will still be performed and the user will be notified of the special condition. The unlogged segment is called the "scratch pad".

Any data that cannot be read during the relocation is represented on the "scratch pad" by unique error codes. Thus, no entity is contracted during the relocation and all entity begins may be preserved.

A "subsequent entity select" operation fetches the entity following a previously selected entity. This function can only be performed if it is preceded at some point by the above-described random entity select. This function has the same output as the random entity select except for the "unable to relocate" status. No scratch pad is created in the subsequent entity select.

A "partial entity select" is used to continue reading the data previously requested via the random entity select or subsequent entity select. The inputs and outputs are the same as subsequent entity select except that the entity number is not explicitly passed to the system. This function is used to transfer as many portions of a page on the storage to the memory as there are corresponding whole integer portions in the text processing system memory, and to continue fetching the remainder of an entity to the text processing system memory when the memory has room to accept additional text.

The recorded portions are forced together, and, therefore, the segments are condensed by alternate reading of an entity followed by recording of the entity. This moves unused portions to build whole unused segments so that these unused segments may be deleted from the system list.

The foregoing and other objects, features, and advantages of the invention will be apparent from the following more particular description of a preferred embodiment of the invention, as illustrated in the accompanying drawing.

DESCRIPTION OF THE PREFERRED EMBODIMENT

Figure 1:
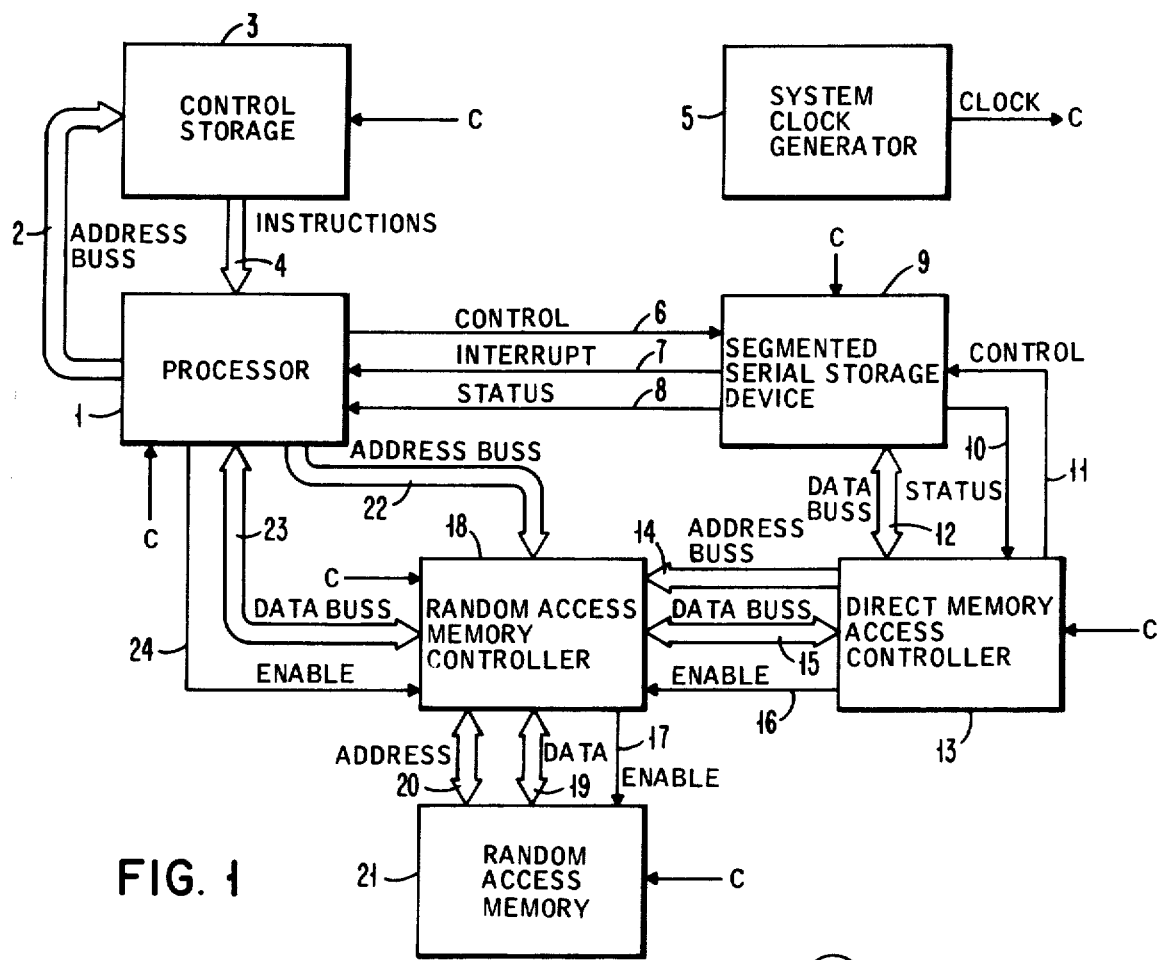
FIG. 1 is a block diagram of a portion of a text processing system having a segmented, serial storage device accessed according to this invention.

Referring now to FIG. 1, a portion of a text processing system is shown having a processor 1 to which is connected an address buss 2 on which instructions in a control storage 3 are addressed to be provided back to the processor along an instruction buss 4. A system clock generator 5 provides clock signals along lines depicted by C to each of the devices in the system. The processor 1 transmits control signals along line 6 to a segmented serial storage device 9 which may, for example, comprise a disc on which the various tracks thereof are segments, or storage 9 may comprise, for example, a tape on which blocks thereof are segments. Storage 9 provides interrupt and status information along lines 7 and 8, respectively, back to the processor 1.

A random access memory 21 is provided to store text data for text creation and revision purposes and to serve as a buffer in relocating data on storage 9. Random access memory controller 18 controls access to the memory via enable line 17, data buss 19 and address buss 20. Transfers of data directly between the storage 9 and memory 21, without invoking the processor 1, are accomplished by use of the direct memory access controller 13. Data is transferred between the direct memory access controller 13 and the random access memory controller 18 via data buss 15 and is transferred between storage 9 and the direct memory controller 13 via data buss 12. The address buss 14 points to the appropriate address in the random access memory 21 to which data is to be written or from which data is to be read in accordance with an enable signal on line 16. Control signals from the direct memory access controller to the storage 9 and status signals from storage 9 to the direct memory access controller 13 are conveyed along lines 11 and 10, respectively. The processor 1 conveys the appropriate address for reading or writing to the random access memory controller 18 via address buss 22. The data is transferred between the processor and the random access memory controller via data buss 23 in accordance with an enable signal on line 24.

Control storage 3 is typically implemented in read only storage with the instructions, therefore, permanently wired thereinto. However, control storage may be implemented in the form of a random access memory such that the instructions must be loaded thereinto each time power is applied to the system. In another embodiment, the processor 1 and control storage 3 may be replaced entirely by combinational logic such that no processor or "instructions" as such are utilized. The flow diagrams described hereinafter will enable any person having skill in the art of logic design to specify hardware logic in accordance with the concepts of this invention. These flow diagrams will also enable anyone having skill in the art of computer programming to program a general purpose digital computer to access a segmented serial storage device and log the utilization of this device in accordance with the concepts of this invention.

Figure 2:
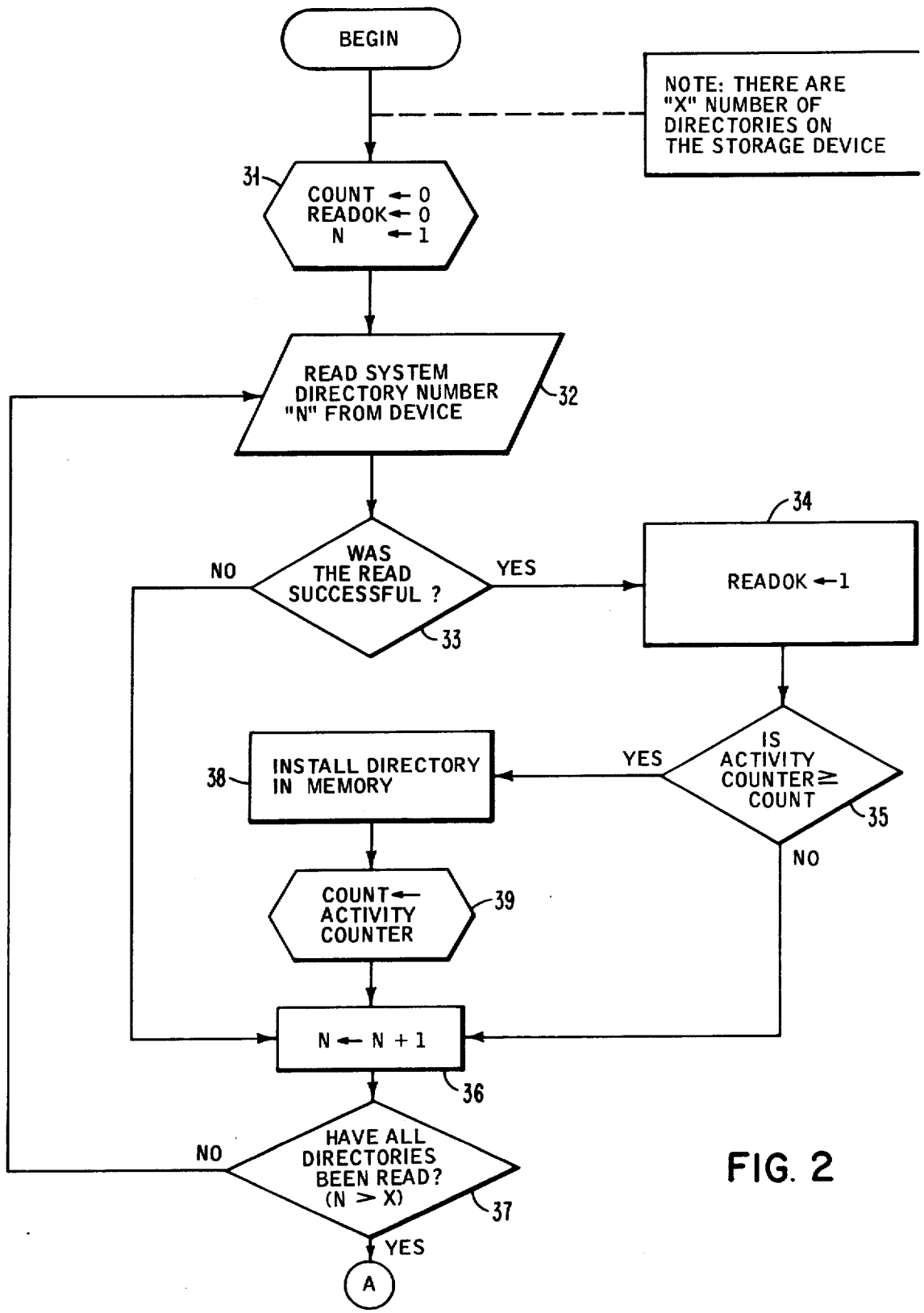

Referring now to FIG. 2, the system initialization process is shown to examine a plurality of logs stored on storage 9 to find the most current log in accordance with the count in an activity counter field thereof. An initial assumption is that there are "X" number of directories or logs on storage device 9. Block 31 indicates that registers COUNT and READOK are set to zero and register N is set to one. In block 32 the system directory number "N" is read from storage 9. At 33 the number read is tested for read errors. If the read was unsuccessful, register N is incremented upwardly by one at 36, and at 37 the contents of the N register are compared with "X". Assuming that the N register contents do no not exceed "X", there are other directories to be read and the operation is repeated by reading the next system directory number "N" from storage 9, as shown at 32. Assuming, at 33, that the read was successful, the READOK register is set to one at 34 and the count of the activity counter stored at the beginning of the directory is compared against the contents of the COUNT register at 35.

If the activity counter contents are greater than or equal to zero, the directory is installed into the random access memory 21 as indicated by block 38. (In this example, with the first compare of the activity count or contents with the COUNT register contents, the activity counter will always be equal to or greater than the COUNT register contents, since the COUNT register was initially set to zero.) At 39, the count register is loaded with the activity counter contents and at 36 the register N contents are incremented by one. A directory is installed into the memory 21 each time the contents of its activity counter exceed the contents of the COUNT register. At 37, when all of the directories have been read, the directory in the random access memory 21 will be the one that was successfully read having the highest activity counter contents.

Figure 3:
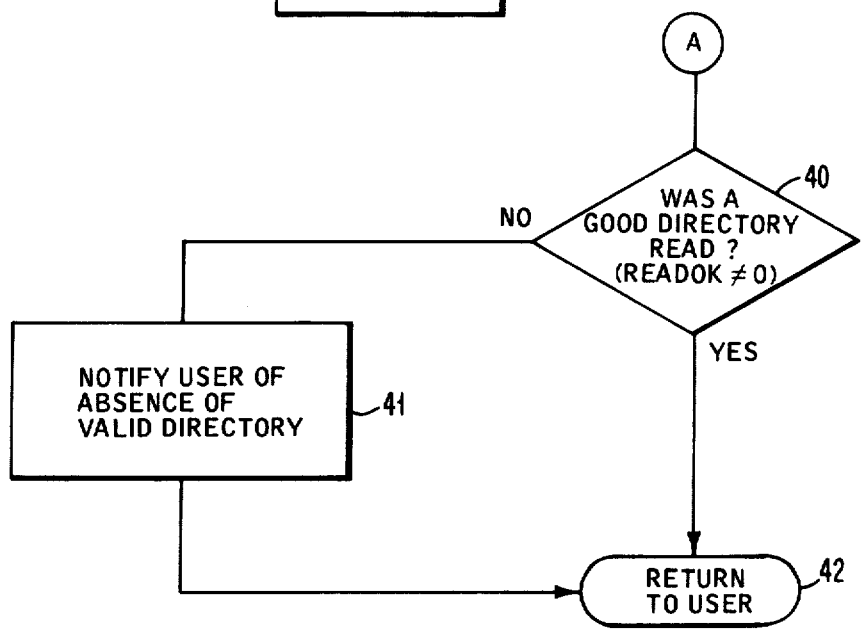
FIGS. 2 and 3 depict the system initialization operation in which the most recently updated log on the storage is chosen for use in controlling access to the storage.

Continuing from FIG. 2 to FIG. 3, when all of the directories have been read, the READOK register is tested at 40 to determine whether its contents are 0 or 1. If the contents are 1 a good directory was read from storage 9 and the operation returns to the user text processing system at block 42. If a good directory was not read, the user is notified of the absence of a valid directory at 41, which will prevent further access of the storage 9.

Refer next to FIGS. 4–9 which show a random entity select operation in which a random page, specified by the operator, and, in turn, by the text processing system to the logging and controlling system, is fetched from the storage 9 and loaded into the random access memory 21. The operation beings in FIG. 4 with the following assumptions. For this example the requested entity number is contained in the N register and is denoted N, the random access memory buffer initial address to which data from storage 9 will be loaded is denoted B and stored in a B register, and the unused capacity of memory 21 is denoted as M and stored in an M register. The capacity M is an integer indicating the size of memory 21, buffer B. This is the number of whole portions of storage 9 that buffer B can contain under given circumstances. For a random entity select, M must be at least the number of portions on a segment minus 1. For this example, assume that each segment of storage 9 includes 8 portions. Thus, M must be at least 7.

When the operation is begun, a test is made at 46 to see if entity N exists by scanning the system log portion of the directory and counting the data and entity begin portions thereof. If the data entity N does not exist, obviously no text data can be read from storage 9 into the random access memory 21. However, the following operation is performed to set the storage controlling system to store any additional text following the last previously stored entity.

A concept incorporated in the storage controlling system is best defined at this point—the select pointer/-record pointer concept. The system maintains two register-stored "pointers" to locations on the segmented serial storage device 9. These pointers each include a field corresponding to a segment on storage 9 and another field corresponding to a particular portion of that segment. The select pointer, denoted SP, is defined to indicate (e.g., point to) the next portion of a segment to be accessed or fetched. Since the system has the capability to partially read an entity (as will be shown in detail in subsequent flow diagrams) and to complete this partial read at a later time, the SP does not always point to an entity begin. When both the segment field and the portion field of the SP are 0, all data has been selected. Entities may only be created, not revised, when the entire SP is 0.

The record pointer, denoted RP, points to the last portion of a segment that was recorded onto the storage device. When a record pointer has the portion field of it equal to 0, the segment it indicates in the segment field has not been recorded upon on any portion. The RP cannot ever, "logically" be greater than or equal to the SP as determined by the system list and system log. (For this definition when the select pointer register contents equal zero, the select pointer is considered to be nonexistent). The pointers may indicate the same storage segment, but not the same portion of that segment.

At the conclusion of each entity store operation, the area "logically" between the RP and SP has the data characteristics thereof set to unused in the system log (with the exception of error-unusable portions). When the select pointer is zero, the area between the RP and the end of the system list is set to unused in the system log. Every segment which has no data on it is removed from the system list. This insures that additional storage space will be available for subsequent work.

Figure 4:
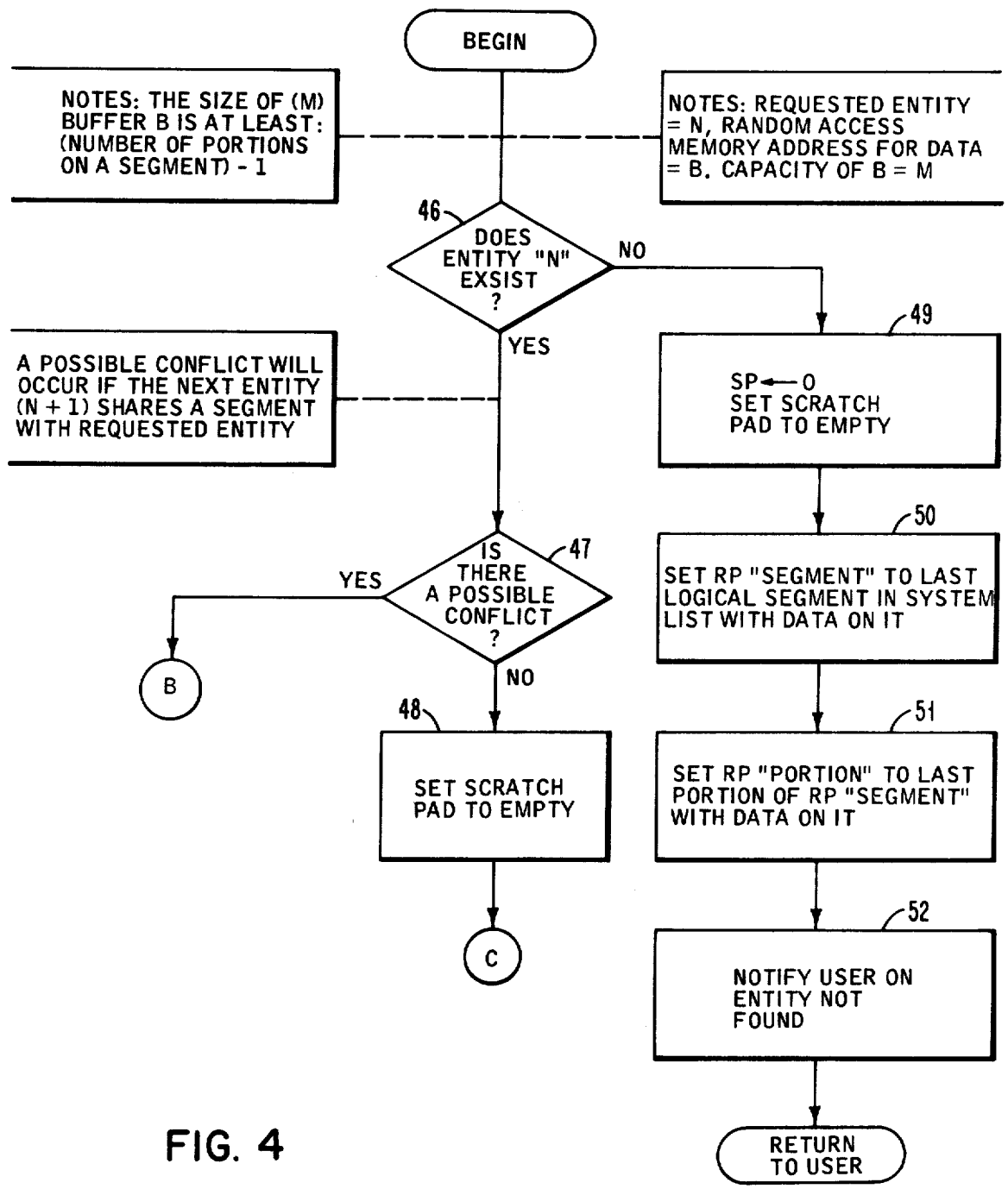
FIGS. 4–9 depict a random entity select operation.

Continuing the above case, FIG. 4, in which the entity does not exist, at 49 both fields of the select pointer SP register are set to zero. A SCRATCH PAD register is set to empty. At 50 the segment field of the record pointer RP register is set to the last logical segment in the system list with data on it and, at 51, the portion field of the RP register is set to the last portion having text data on it of the segment number denoted by the segment field portion of the RP. At 52, the user is notified that the entity was not found. Thus, the select pointer has been set to indicate that there is no further stored text to be selected and a record pointer has been set such that text in the random access memory 21 may be stored immediately succeeding the last stored entity in storage device 9.

Returning to 46, consider the more probable case in which the specified entity N does exist. If the next entity, N+1, begins on the same segment of storage on which entity N ends, a possible conflict can occur. The problem is that if the text of entity N is accessed and enlarged, it will no longer fit on the same storage area from which it came. If the next entity does not begin on the same segment on which the specified entity N ends, there can be no conflict, since any expansion of the text beyond the segment boundary could be stored on a previously unused segment. Referring now to block 47, FIG. 4, consider the case in which no conflict can exist. At 48, the SCRATCH PAD register is set to empty and the operation proceeds to C FIG. 7. At 70, the segment field of the SP register is set to the number of the first segment on which entity N is stored. This information is obtained from the directory. At 71, the portion field of the SP register is set to the number of entity N's first data portion from information obtained from the system log portion of the directory. At 72, if the entity to be accessed is the first entity of a document, at 73 the segment field of the RP register is set to the segment number of storage 9 containing the first segment of entity N at 73 and, at 74 the portion field of the RP register is set to zero.

Figure 8:
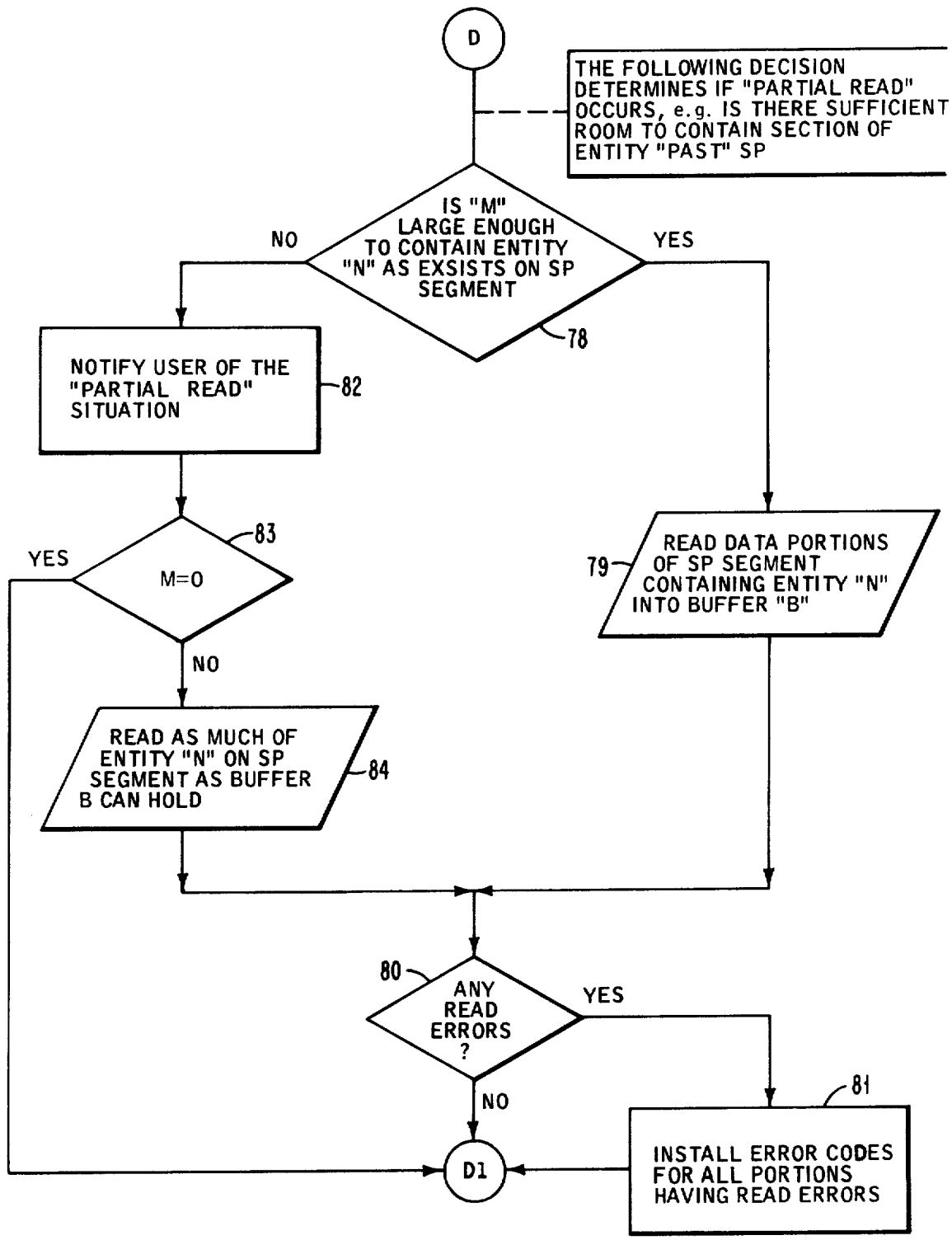

Before proceeding to FIG. 8, assume that the requested entity N was not the first entity, such that the operation continues at 75 wherein the segment field of the RP register is set to the number of the last data segment of entity N−1 and, at 76 the portion field of the RP register is set to the number of the last portion on which data of entity N−1 was stored.

Proceeding to D, FIG. 8, the following decision at 78 determines if a partial read situation occurs by determining whether there is sufficient room in memory 21 to contain whatever section of the entity that may exist past the select pointer but on the same segment as indicated by the segment field of the select pointer. At 78, if M (memory size by portions) is large enough to contain whatever portions of entity N exists on the segment specified by the segment field of the SP register, at 79 text portions of the SP segment containing entity N are read into the random access memory 21 at address B. At 80, if there are no read errors, the operation proceeds to D1, as subscribed hereinafter. If there are read errors, at 81 error codes are input to buffer B for each storage location in each portion having read errors to provide an indication to the operator as to where the read errors occurred, and the operation proceeds to D1.

At 78, FIG. 8, assuming that M was not large enough to contain entity N as it exists on the SP segment, at 82 the user is notified of the heretofore described partial read situation. At 83, if M is zero, indicating that the memory is full, the operation proceeds to D1 as described hereinafter, and, if M is not equal to zero, at 84, the operation proceeds by reading as much of entity N on the SP segment as memory 21 can hold. Any data read into memory 21 is tested for errors with error codes being input if necessary, in accordance with 80 and 81, previously described.

Figure 9:
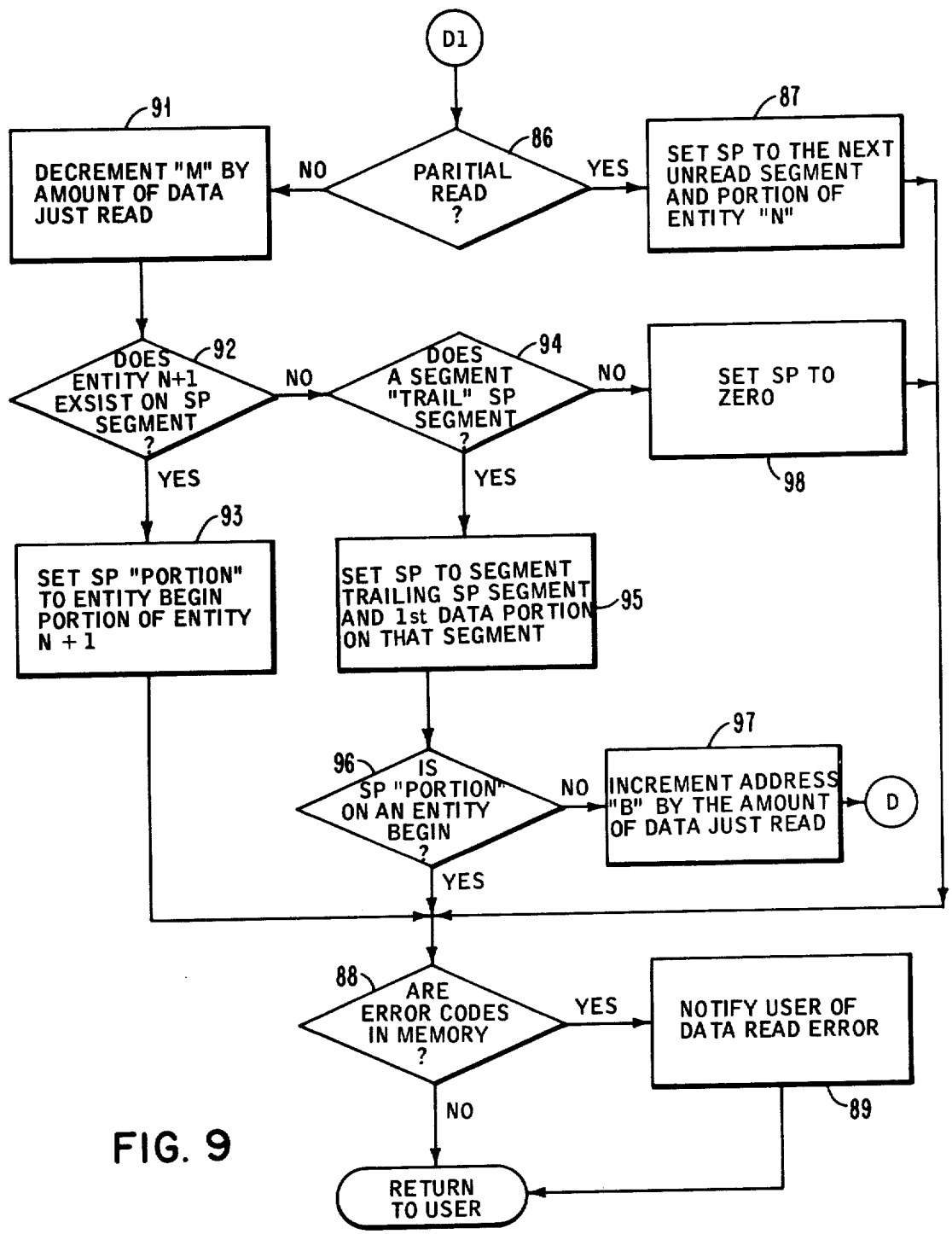

Referring now to D1, FIG. 9, at 86 assume that a partial read was necessary because of insufficient buffer capacity. At 87, the select pointer register is set to the next unread segment and portion of entity N so that reading can continue from this point when space is available in memory 21. At 88, if there are any error codes in the data that was written into the memory 21, the user is notified at 89. If not, the system returns to the user.

In FIG. 9, at 86 consider the case in which there was not a partial read of data. At 91, the M register is decremented by the number of portions of data just read. At 92, if the entity N+1 exists on the SP segment, all of entity N has been read, and at 93 the portion field of the SP register is set to the entity begin portion of entity N+1. Thus, the select pointer now points to the beginning of the next entity in the logical sequence of entities in the document. At this time the test is made for error codes in memory 21 and the user is notified if there are error codes.

At 92, if entity N+1 does not exist on the SP segment, the system list portion of the directory is tested at 94 to see if a segment trails the segment specified by the segment field of the SP register. If not, at 98 the SP register is set to zero which indicates that there are no further entities that can be read. The system is then returned to the user after notification of any error codes previously read into memory 21, if any. At 94, if a segment does trail the select point segment, the segment field of the SP register is set to the trailing segment and the portion field of the SP register is set to the first data portion on that trailing segment at 95, this information being obtained from the directory. At 96, if the portion field of the SP register is now set on the portion of an entity begin, then reading of the requested entity has been completed, and the system is returned to the user after notification of any error codes in memory 21, if any. If the portion field of the SP register is not pointing to an entity begin on the trailing segment, at 97 address B is incremented by the amount of data just read and the operation proceeds to D which will continue reading on the next segment.

Referring back to FIG. 4 at 47, assume that there is a possible conflict. That is, the next entity (N+1) shares a segment with the requested entity. Again, the conflict will occur if the requested entity is expanded in size such that there is not sufficient room on the segment in which the N entity ends to complete recording of the expanded N entity without writing the data in the portions storing the N+1 entity. Proceeding now to B, FIG. 5, at 55 an empty segment is located on storage 9 and defined as ES. The empty segment is found by referring to the directory to identify a segment which has neither data nor error-unusable portions in the system log and is not in the system list portion of the directory. At 56, assume now that there was an available empty segment on storage 9 so that at 57 the conflicting data from the last segment containing entity N is read into address B of memory 21. This conflicting data is all data on the segment on which entity N ends that succeeds the end of entity N. Memory 21 serves as a temporary buffer for this data to allow this data to be copied onto the ES segment. At 58 if any errors are encountered in reading the conflicting data, error codes are written into memory 21 for all portions read from storage 9 that have read errors, as indicated at 59. After the error codes have been written, or if there were no error codes, at 60 the conflicting data is read back out of memory 21 and is written onto the ES segment, as indicated at 60.

The writing operation is checked for write errors at 61, and if there are any write errors the data characteristics of the ES segment just written on are temporarily set to indicate data in each portion thereof, at 62, to prevent further reuse of this segment in attempting to relocate the data. The operation then proceeds back to 55 at which time another empty segment is attempted to be located on which to relocate the conflicting data.

Figure 5:
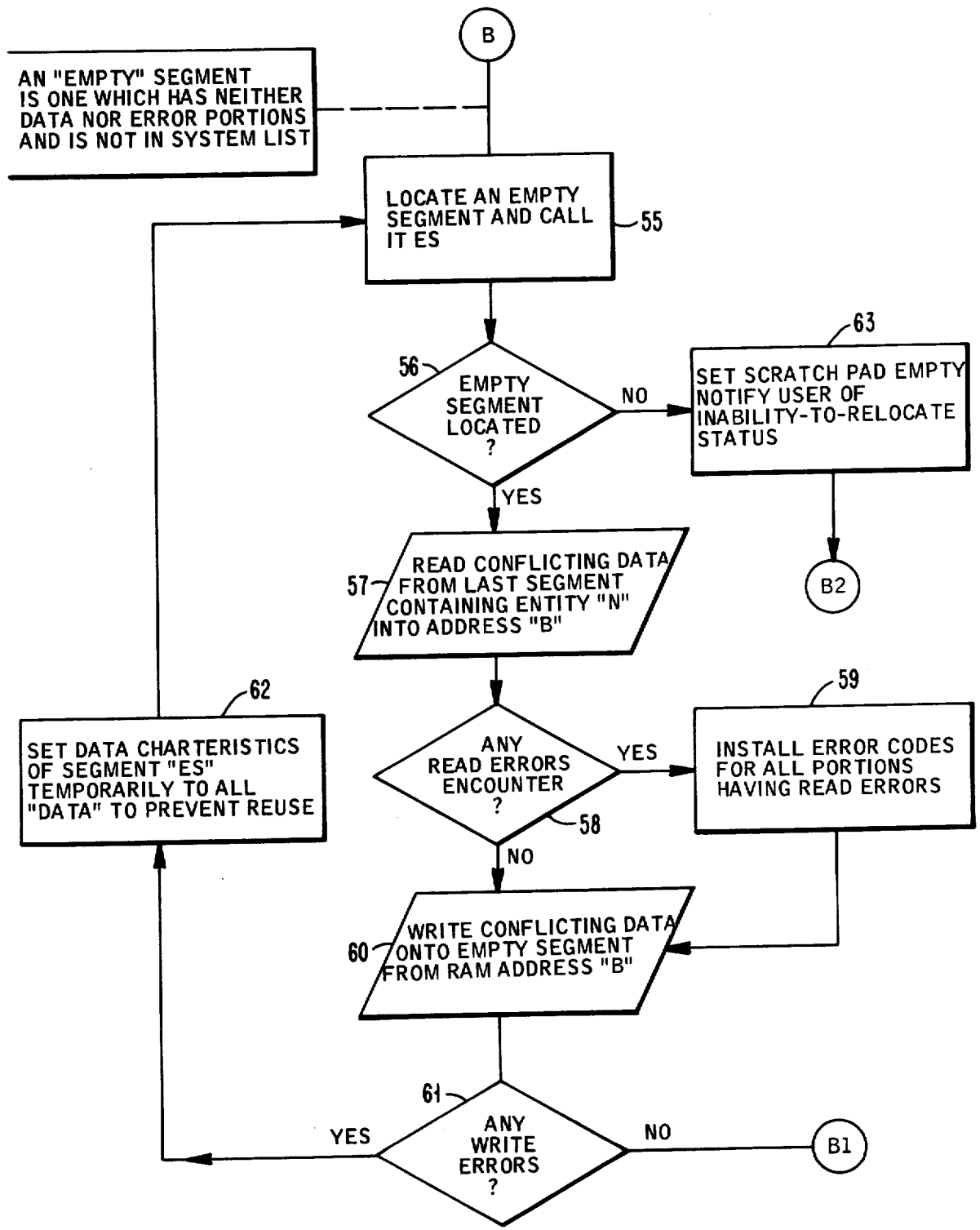
Figure 6:
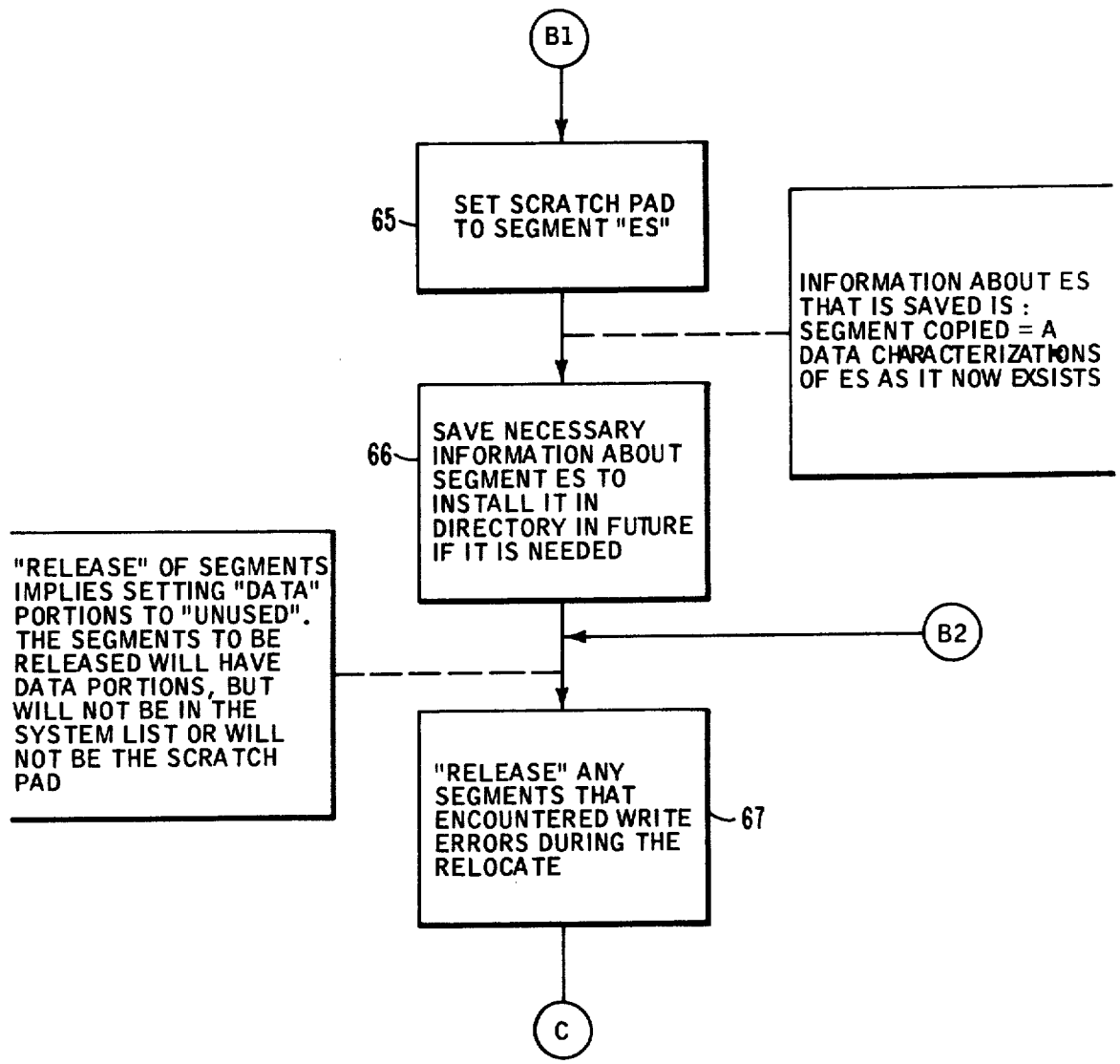

At 61, assuming that no write errors occurred in relocating the data, the operation proceeds to B1, FIG. 6. At 65, the SCRATCH PAD register is set to the segment ES. At 66, the necessary information about segment ES is saved so that it can be installed in the directory in the future if it is ultimately needed. (It will be needed, for example, if the recalled data is expanded such that it would, otherwise, overwrite the conflicting data now stored on the scratch pad segment.) The information about the ES segment that is saved is the segment number from which the relocated data was copied is stored in an A register and defined as A, and the data characteristics (unused-available, error-unused, data, or data and entity begin) of the ES segment as it now exists. Proceeding now to 67, any segments that encountered write errors during the relocation of the data are now released. In FIG. 5, block 62, it will be recalled that segments on which write errors occurred were set in the system log to indicate data on all portions thereof. Releasing the segment, therefore, implies resetting these data portions in the system log to unused. The segments were never put in the system list.

Figure 7:
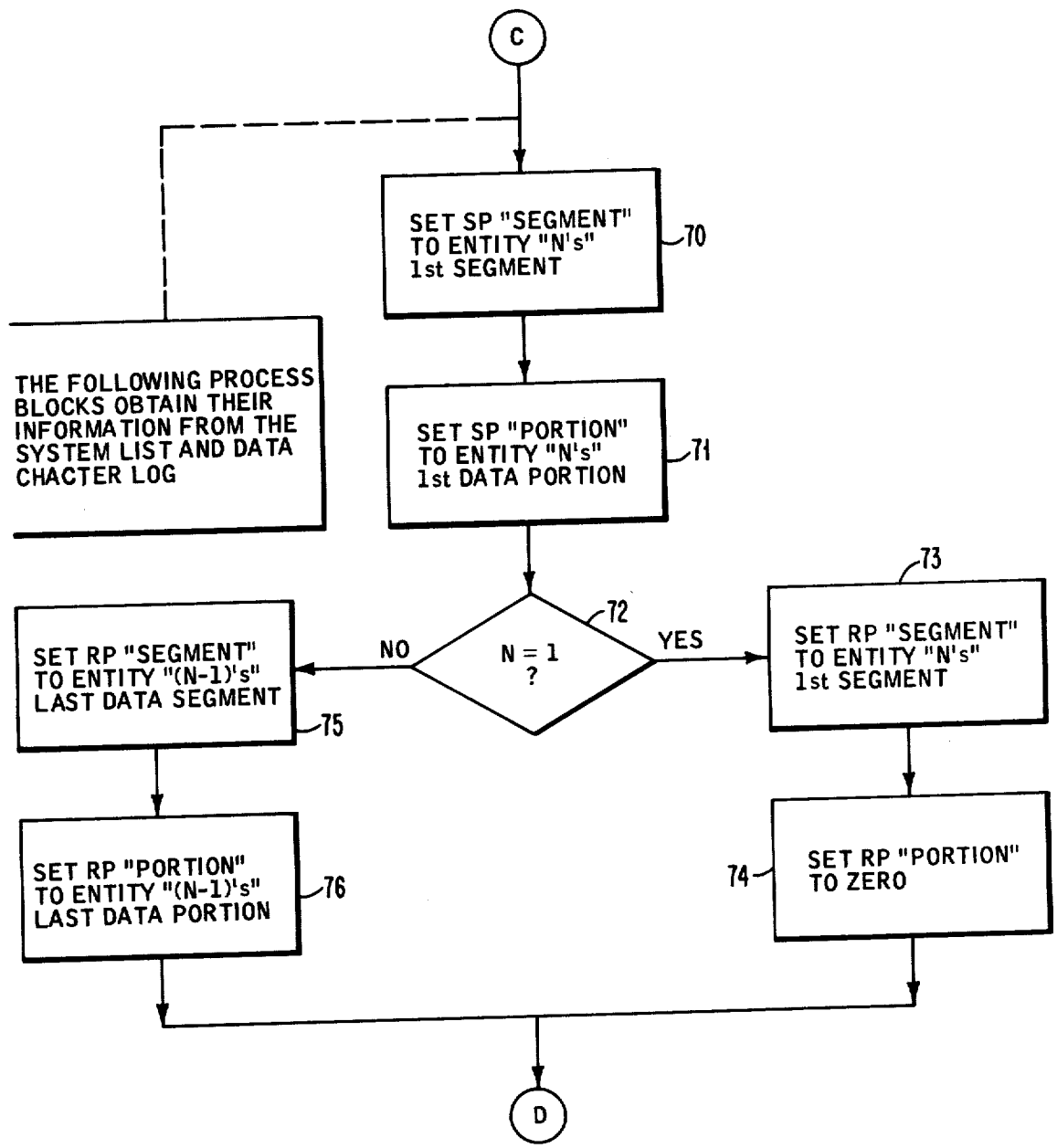

After any segments in which writing errors were encountered are released, the operation continues at C, FIG. 7 to allow the requested entity to be written into memory 21. Referring back to FIG. 5, if a possible conflict existed to invoke an attempt to relocate the conflicting data, if no empty segment is located at 56, the scratch pad is set to empty and the user is notified of the inability-to-relocate status in the system at 63. Operation then proceeds to B2, FIG. 6. After any segments are released that encountered write errors the operation proceeds to C as described above.

Figure 10:
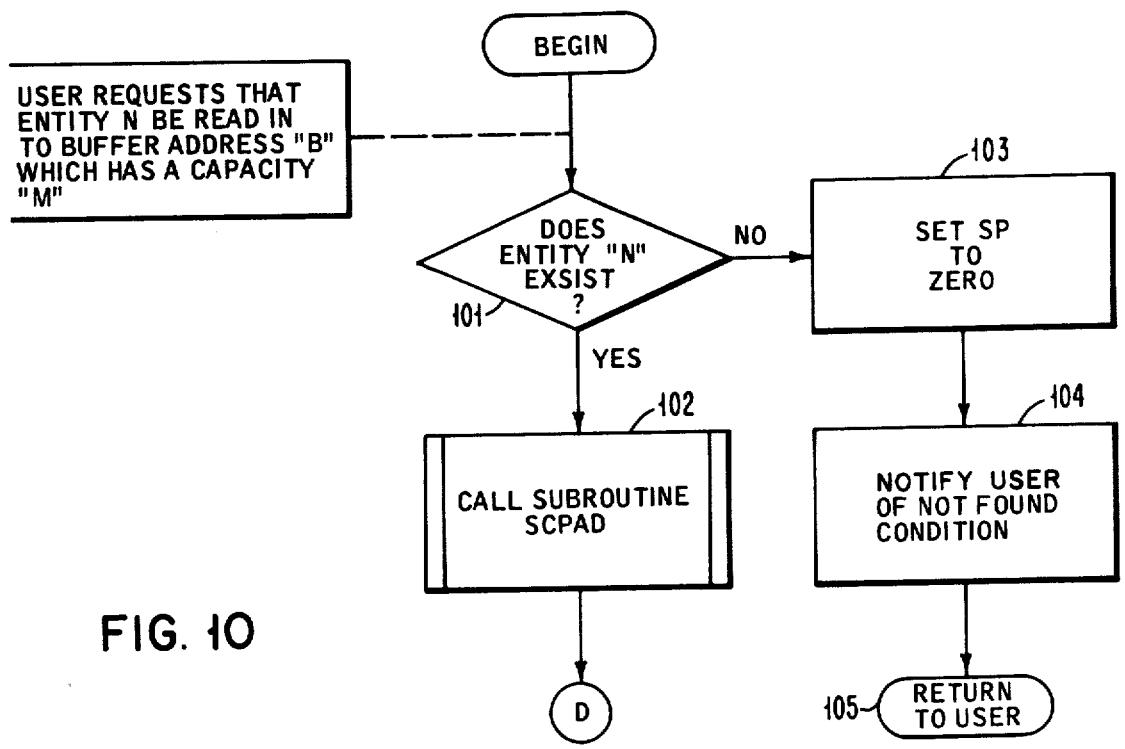
FIG. 10 depicts a subsequent entity select operation.

Another category of system operation is the subsequent entity select which assumes that a random entity select operation has previously occurred. The point here is that the select pointer has been previously set at the end of the previous entity select operation to point to the entity that will be accessed by the subsequent entity select operation, there being no initialization of the select pointer at the beginning of the subsequent entity select operation. In FIG. 10 the operation begins by a request from the user that entity N be read into buffer address B of memory 21 which has a capacity M. At 101, the system log portion of the directory is interrogated to determine if entity N does in fact exist. If not, the select pointer register is set to zero at 103, and at 104 the user is notified that the entity was not found in storage 9. At 105, the storage controlling system is then returned to the user.

Assume now that at 101 the entity was found to exist in the system log portion of the directory. The subroutine SCPAD (Scratch Pad) is called into the operation at 102.

Figure 11:
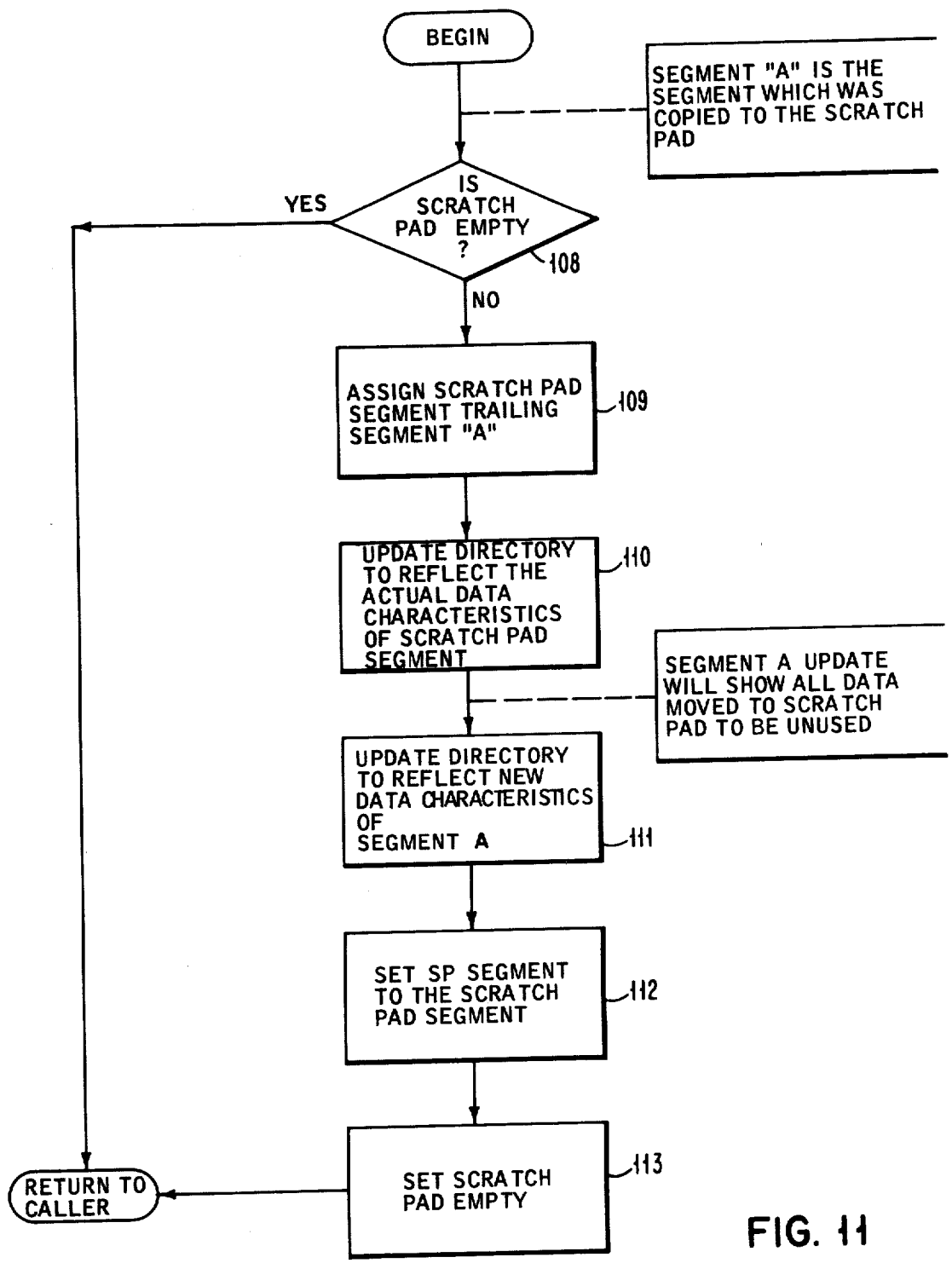
FIG. 11 depicts a scratch pad linking operation performed during both the subsequent entity select and entity record operations.

Referring now to FIG. 11, the SCPAD operation is described. At 108, if the SCRATCH PAD register is empty, the operation returns to the caller, which is point is at D, FIG. 10. Thus, the operation then proceeds to D at FIG. 8 to proceed with the reading of data in the subsequently selected entity into the memory 21. If, however, the SCRATCH PAD register is not empty, the scratch pad segment is logically linked into the list of segments in the system list, as follows. At 109 the system list portion of the directory is updated to insert the scratch pad segment number trailing the number of segment A. Segment A is the segment from which data trailing a previously selected entity was copied to the scratch pad. At 110 the system log portion of the directory is updated to reflect the actual data characteristics of the scratch pad segment. At 111, the system log portion of the directory is updated to reflect the new data characteristics of segment A. Portions of segment A copied onto the scratch pad segment will now be listed as unused in the system log. At 112, the select pointer SP register segment field is set to the scratch pad segment. At 113, the SCRATCH PAD register is set to empty and the operation returns to the caller, point D, FIG. 10. From this point, reading of the requested entity into the memory 21 continues. It will be noted that reading is from the data on the scratch pad segment and not from the data on segment A from which the scratch pad data was copied.

Figure 12:
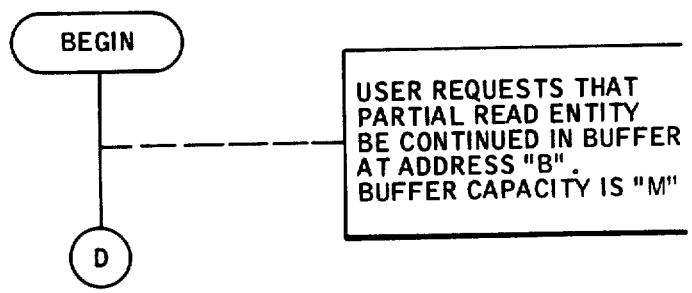
FIG. 12 depicts a partial read entity select operation.

Another system operation is the partial read entity select, the start of which is shown as FIG. 12. In this case, a request from the user is that reading of a previously partially read entity be continued from storage 9 into memory 21 at buffer address B. When the buffer capacity M becomes larger than 0, reading of the entity, or a portion thereof, can continue at D, FIG. 8.

Figure 13:
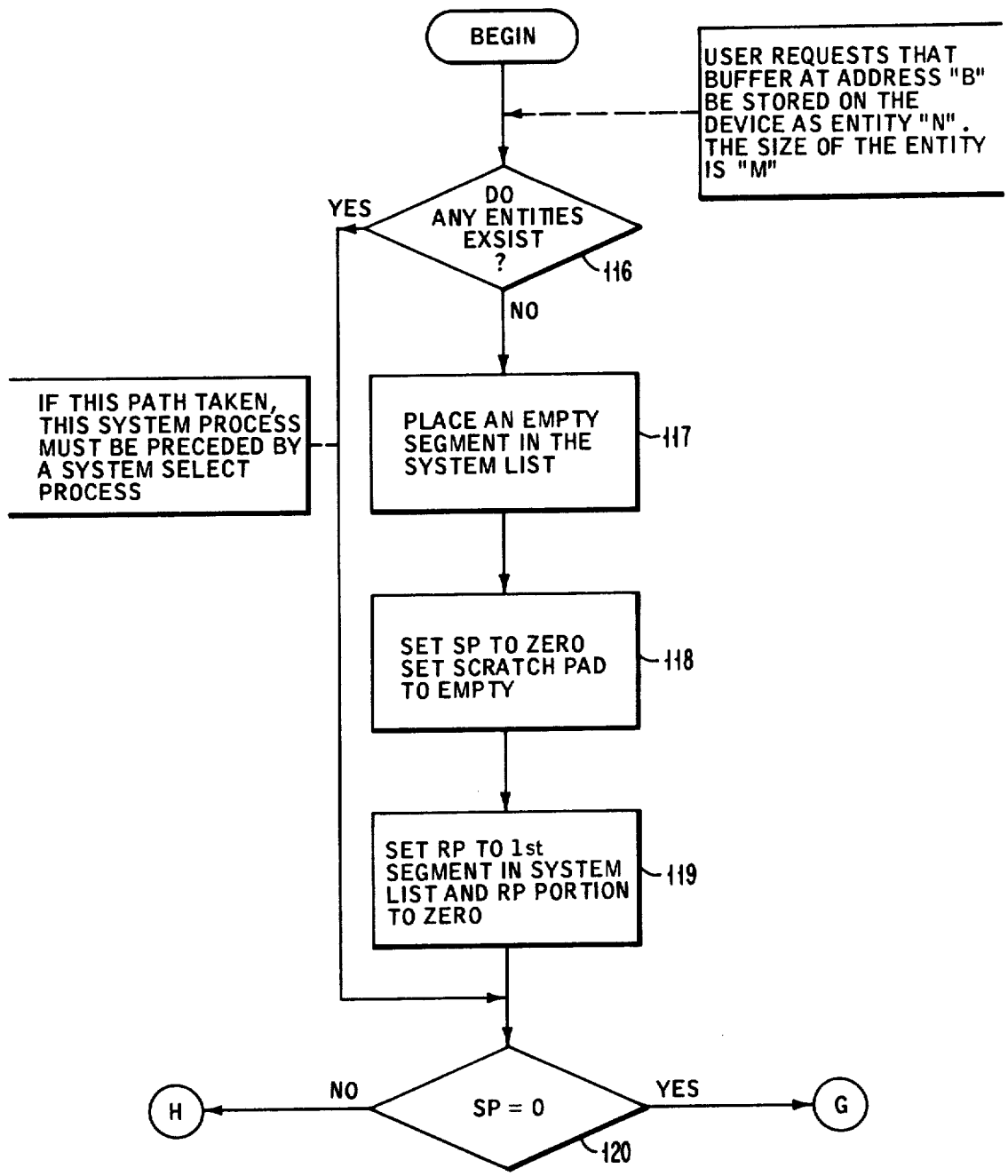
FIGS. 13–20 depict the entity record operation.

A major operation of the storage logging and controlling system takes place when an entity must be recorded onto storage 9. Appropriate segments and portions thereof must be chosen for the recording and this information must be logged. Referring now to FIG. 13, a recording operation begins by a request from the user that the contents of memory 21 at address B be stored on the storage 9 at the entity N. The size of the entity is M portions.

At 116, the system log portion of the directory is interrogated to determine if any entities exist on storage 9. If no entities exist, an empty segment must be chosen for recording and the select pointer, scratch pad, and record pointer registers must be set. At 117, an empty segment is found and placed in the system list with area of the directory. At 118, the SP register is set to 0 and the SCRATCH PAD register is set to empty. Then at 119 the segment portion of the RP register is set to the segment in the system list and the portion field of the RP register is set to zero. The operation continues at 120. At 116, if an entity does exist the operation proceeds directly to 120. If any entity does exist, the assumption is that the record and select pointers have already been set since it is assumed that when entities do exist, an attempt to select one of them must have been made before a recording process can take place.

Figure 14:
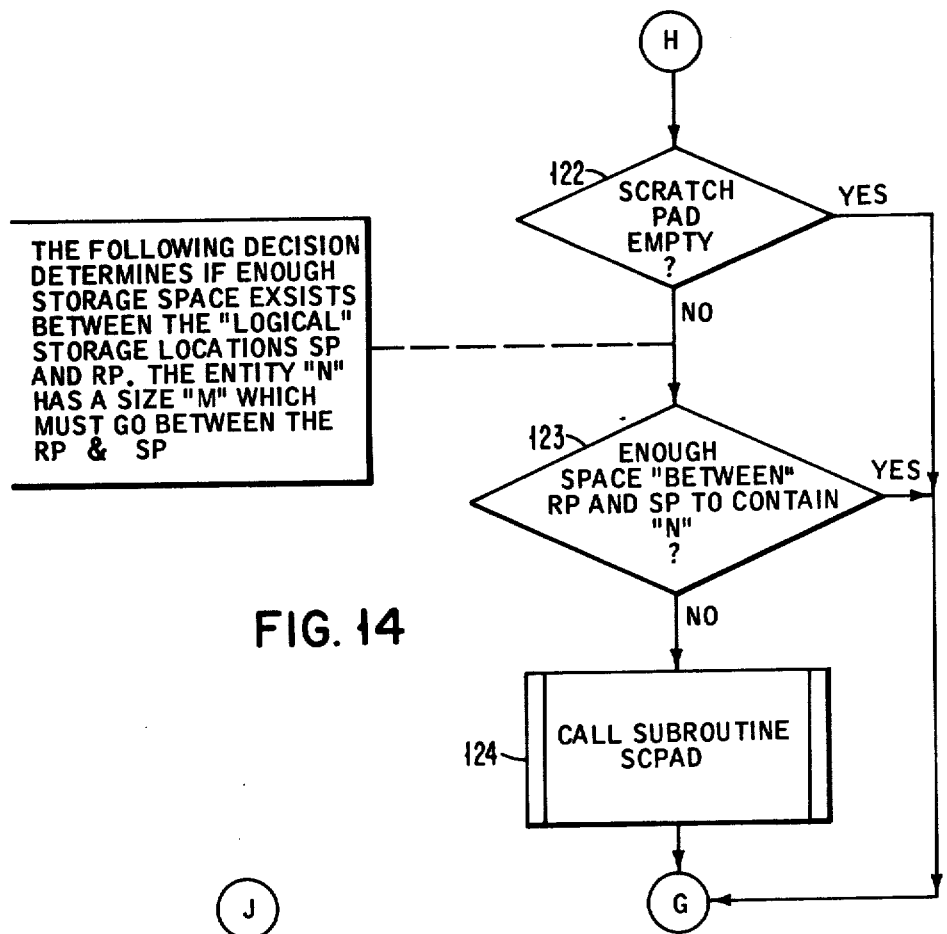

Now at 120 the SP register is tested for zero status. The SP register will be zero if no entities previously existed or if there are existing entities with the record pointer pointing to the last portion in the existing entities. In other situations, the select pointer register will not be zero and operation proceeds to H, FIG. 14.

With the select pointer not equal to zero, the select pointer is pointing to a next entity of one of more entities and the record pointer precedes the select pointer. Recording will start at the record pointer, but must stop before actually reaching the select pointer. Thus, in FIG. 14, at 122, the SCRATCH PAD register is tested to see if it empty. If it is empty, there is not even a potential conflict in which the record pointer might reach the select pointer so the operation procedes to G to continue the recording operation as will be described hereinafter.

If the scratch pad is not empty, a determination must be made as to whether the text that originally preceded the scratch pad contents has been expanded so that it will no longer fit back onto the segment containing an entity that begins after the previously selected entity that is to be stored. Thus, assuming that the scratch pad is not empty, at 123 a test is made to determine if there is enough space between the record pointer and the select pointer to contain entity N. If there is enough space, the recording operation can proceed to G. If there is not enough space, the subroutine SCPAD as previously described in FIG. 11, is called into the operation. Calling this subroutine places the scratch pad into the system list and system log so that the current recording process can now write into the now unused portion of the record pointer and select pointer segment.

Figure 15:
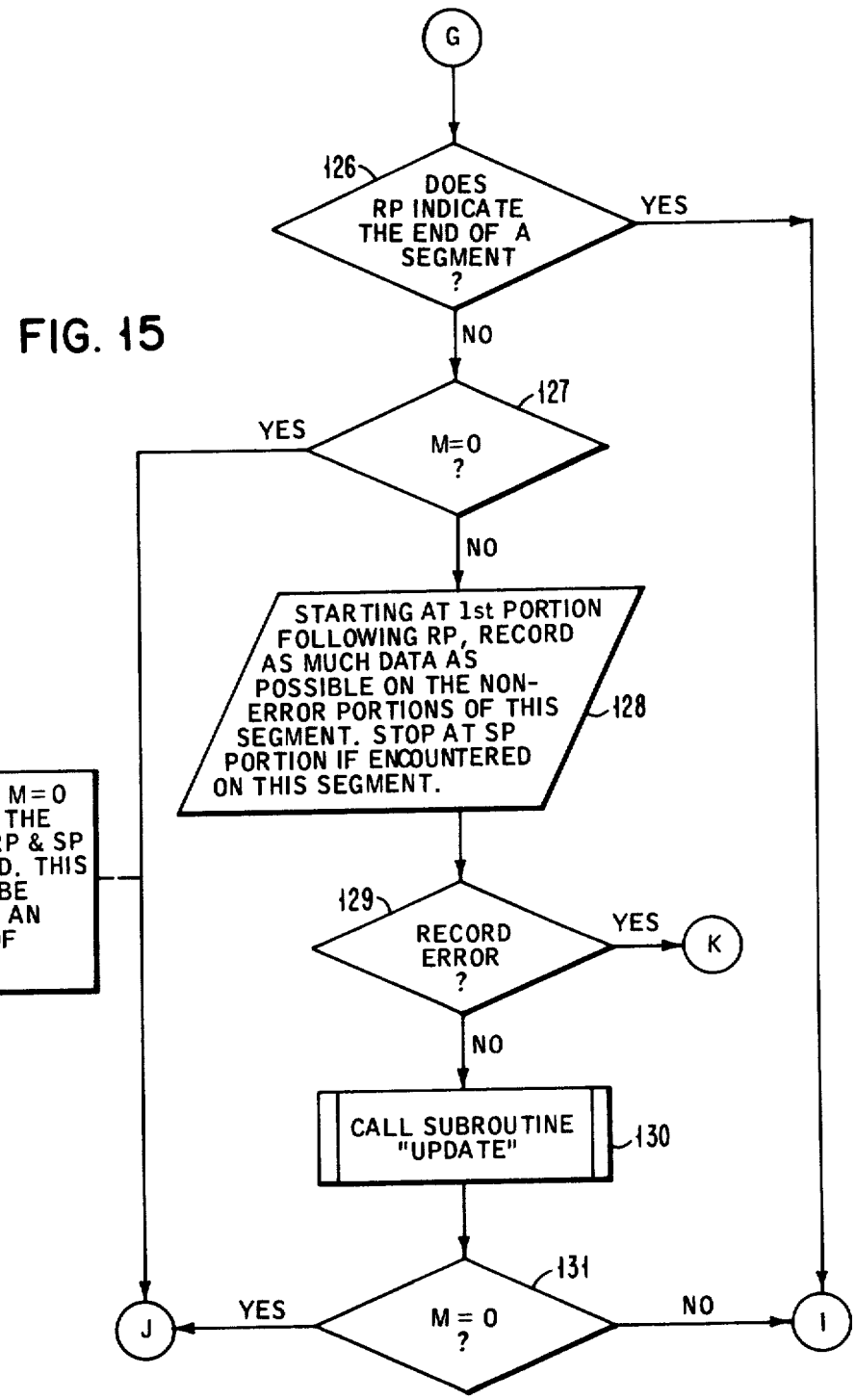

The operation now proceeds to G, FIG. 15, or would have proceeded directly to G, if, at FIG. 13, 120, the select pointer had been at zero. At 126 the portion field of the PR register is tested to determine if the record pointer is pointing to the end of a segment. If so, the operation proceeds to I, described hereinafter, at which time another segment must be found for recording, if any exists. If the record pointer is not pointing to the end of a segment, at 127 the contents of memory 21 are tested to see if they are zero. This is part of the recording operation, since the operation of restoring data portions and segments from used to unused status is to access this data from storage 9 into memory 21, delete this data from memory 21, and request recording after the data has been deleted.

Figure 16:
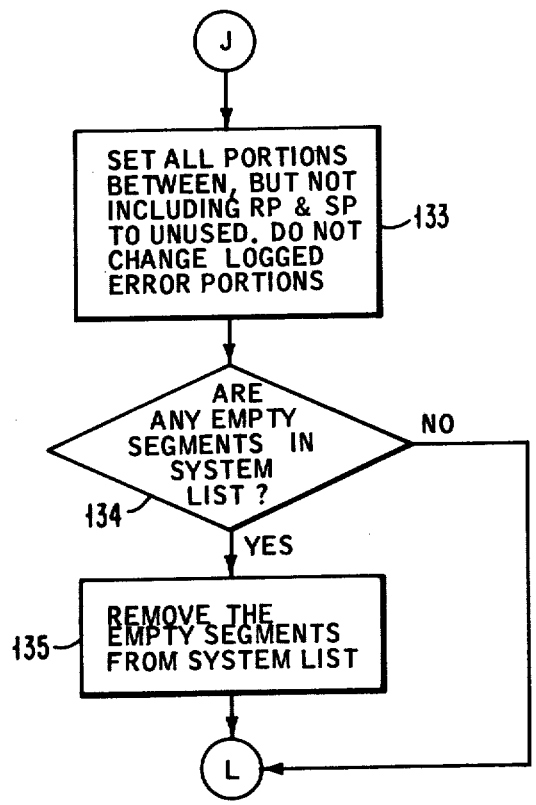

Assume that it is desired to delete data from storage so that the contents of memory 21 are zero, at 127, FIG. 15, the operation proceeds to J, FIG. 16. At 133, FIG. 16, all portion fields of the system log area of the directory between, but not including the record pointer position and the select pointer position are set to unused. The status of any logged error portions between the record pointer and the select pointer is not changed. At 134, the directory is searched to determine if there are any empty segments in the system list. If so, at 135 these segments are removed from the system list so that the system will consider them to be usable empty segments. The operation then proceeds to L, FIG. 18. If there are no empty segments in the system list, the operation proceeds directly to L.

Figure 18:
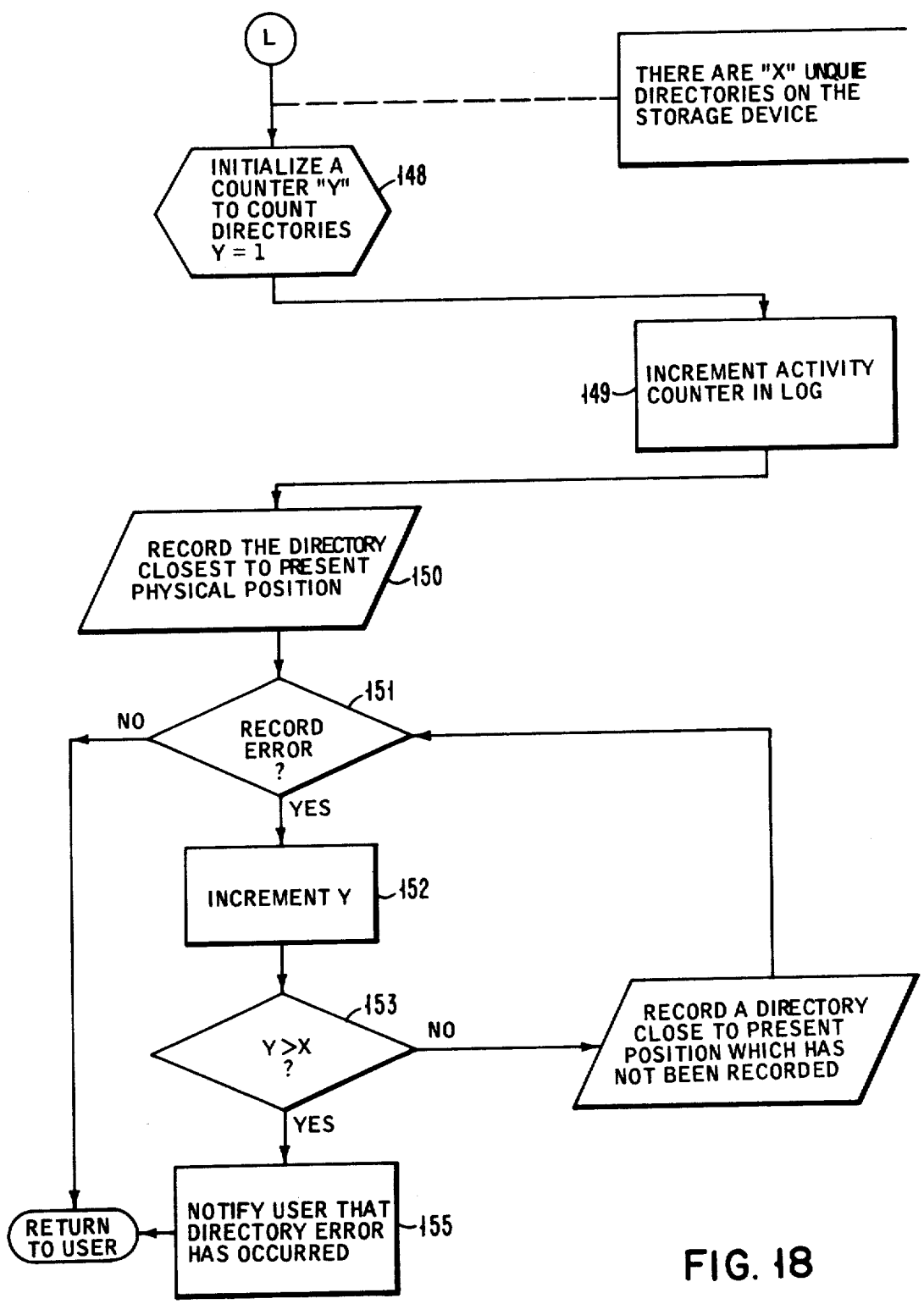

In FIG. 18, all that remains in this deletion portion of the record operation is to update the directory and record the updated directory on storage 9. At 148, a counter Y is initialized to one to count the directories recorded on storage 9. At 149, the activity counter at the very beginning of the directory in the random access memory 21 is incremented by 1. At 150, the directory is then recorded at the dedicated directory recording area on storage 9 that is physically closest to the current position of the read/write transducer associated with storage 9. At 151, if no record error occurs during recording of the directory, the operation is returned to the user. If there is a record error at 151, counter Y is upwardly incremented one count at 152 and a test is made at 153 to determine whether the counter Y contents exceed the number of directories X. If Y does not exceed X, there are other directory recording areas on storage 9 and another attempt is made at 154 to record the directory in the next closest dedicated directory recording area. If Y exceeds X there are no other directory recording areas and the user is notified that the directories are in error and that the storage 9 media is no longer usable.

Referring back to FIG. 15, the immediately preceding discussion has been directed to the deletions portion of the record position wherein M equals zero at 127. Assume now that text from memory 21 is to be stored back onto storage 9 such that M is not equal to zero. The record pointer is now positioned for recording and, at 128, starting at the first portion following the record pointer, as much data from memory 21 is recorded as possible on the non-error portions of the segment pointed to by the segment field of the record pointer. Recording is stopped just before the portion indicated by the portion field of the select pointer if the select pointer is encountered on this segment. At 129 the newly recorded data on storage 9 is tested for record errors. If there are no record errors, the UPDATE subroutine operation is called at 130.

Figure 21:
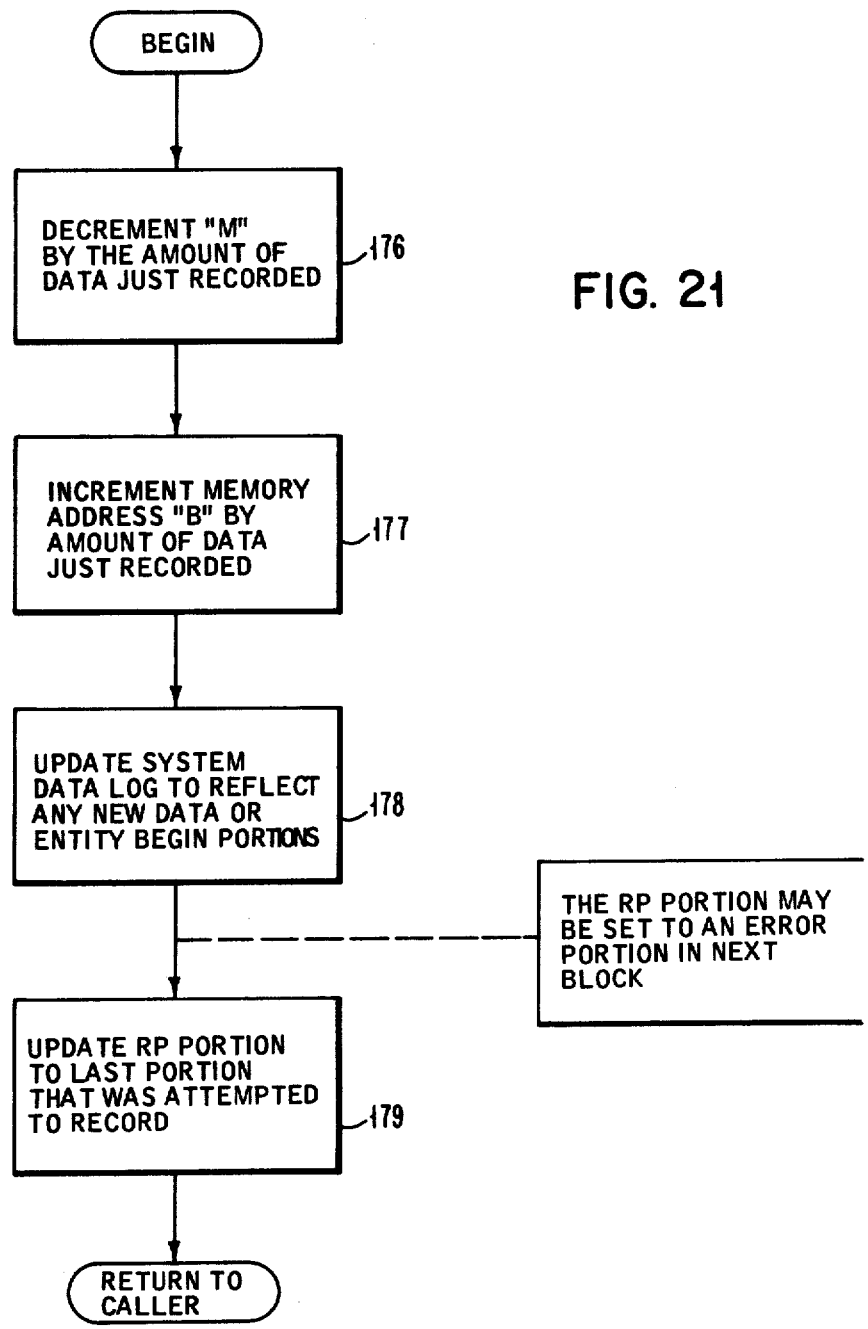
FIG. 21 depicts the update operation used as part of the entity record operation.

Referring now to FIG. 21, the UPDATE operation is shown wherein at 176 M (the number of portions of data in memory 21) is decremented by the amount of data just recorded. At 177 memory address B is incremented by the amount of data just recorded. The system log is updated to reflect any new data or data and entity begin portions that were used during the recording operation. Finally, at 179 the portion field of the RP register is set to the last portion on which recording was attempted, regardless of whether that portion was an error portion or not. At this time, the operation is returned back to 131, FIG. 15.

Assume that at 129, FIG. 15, there were record errors in the data just recorded. The operation proceeds to K, FIG. 17. First, at 138 the SCPAD (scratch pad) subroutine is called which is shown in FIG. 11 and has been previously described. If the scratch pad is empty, the operation returns immediately to 139 and if the scratch pad is not empty, the scratch pad segment is linked into the directory and the operation proceeds at 139. At 139, if any additional empty segments exist on storage 9, the ERRUP (error update) subroutine is called at 145.

Figure 22:
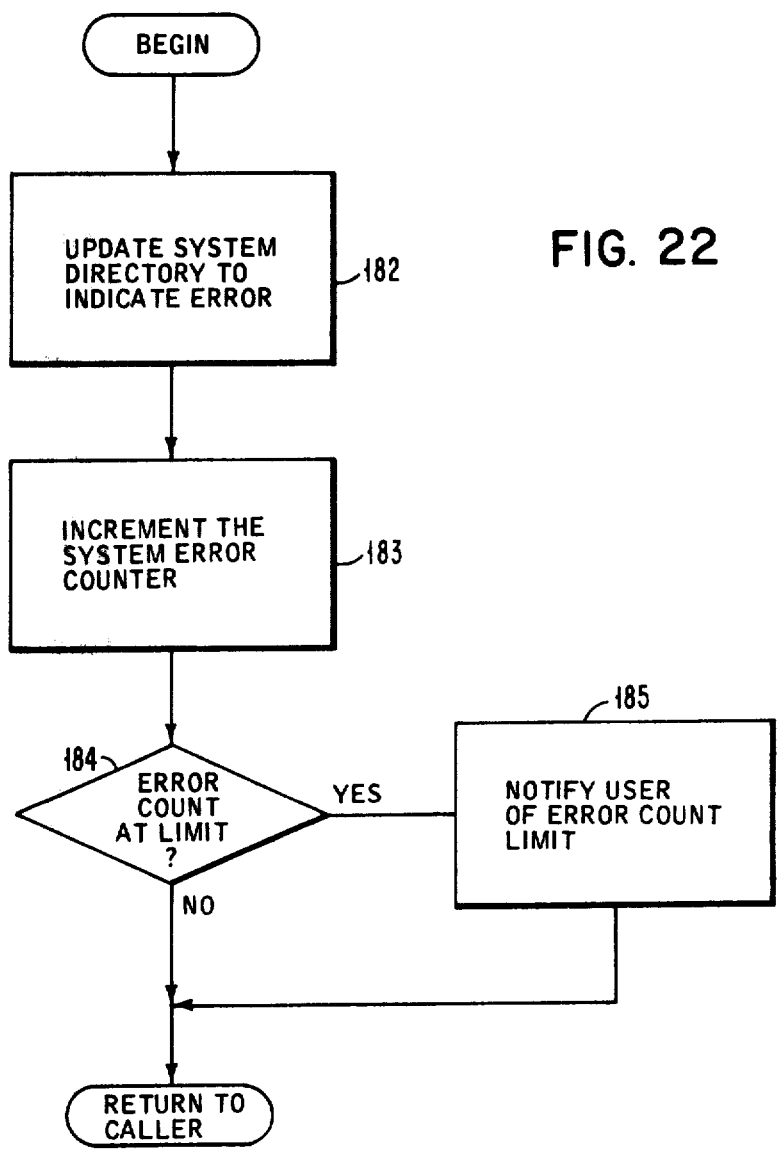
FIG. 22 depicts the error update operation used in the entity record operation.

Referring now to FIG. 22, the ERRUP subroutine begins at 182 by updating the system log portion of the system directory to indicate the error portion. At 183, the system error portion counter is incremented for each error portion logged. At 184, a test is made to determine whether the contents of the error counter are equal to the error limit. The error limit is a predetermined number one unit greater than the number of error portions that will be allowed without cautioning the user. If this limit has been reached, at 185 the user is notified of the error limit. After notification, or if the error count has not reached the limit, the operation returns to the caller at FIG. 17, point G. Then, at FIG. 15, subsequent recording attempts are made, if indicated.

Figure 17:
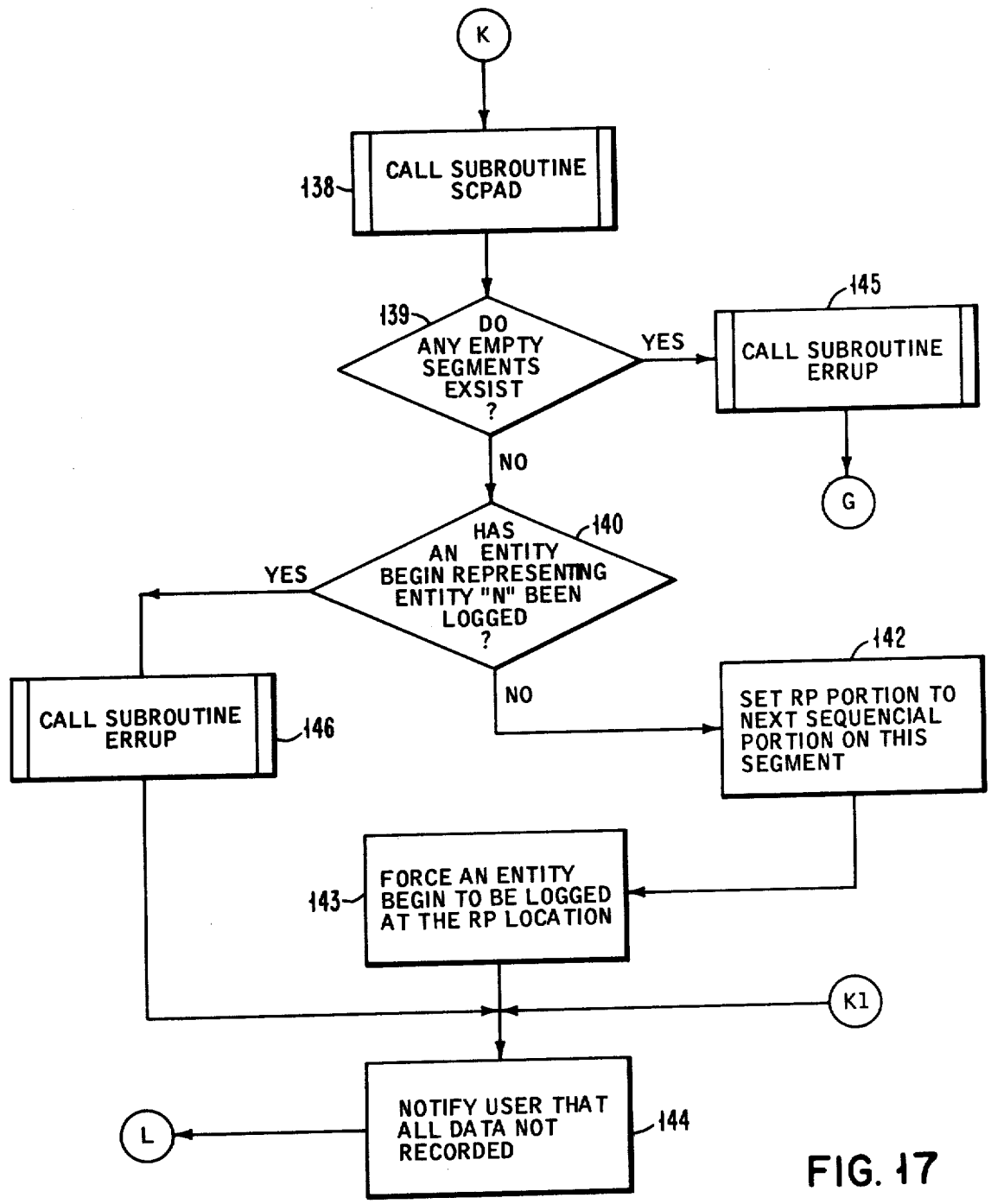

In FIG. 17, assume at 139 that no further empty segments exist. At 140, a test is made to see if an entity begin for the entity N being recorded has been logged. If the entity begin has been logged, ERRUP subroutine in FIG. 22 will be called. At the completion of this subroutine no further data recording is attempted and the user is notified that all data to be recorded has not been recorded at 144. Then the operation proceeds to L, FIG. 18 as previously described, so that the directory can be updated and re-recorded onto storage 9. At 140, if an entity begin representing entity N has not been logged, the portion field of the record pointer is set to the next sequential portion on this segment at 142 and, at 143 the entity begin is forced. This prevents the loss of entity begins and implicit renumbering of subsequent entities.

Figure 19:
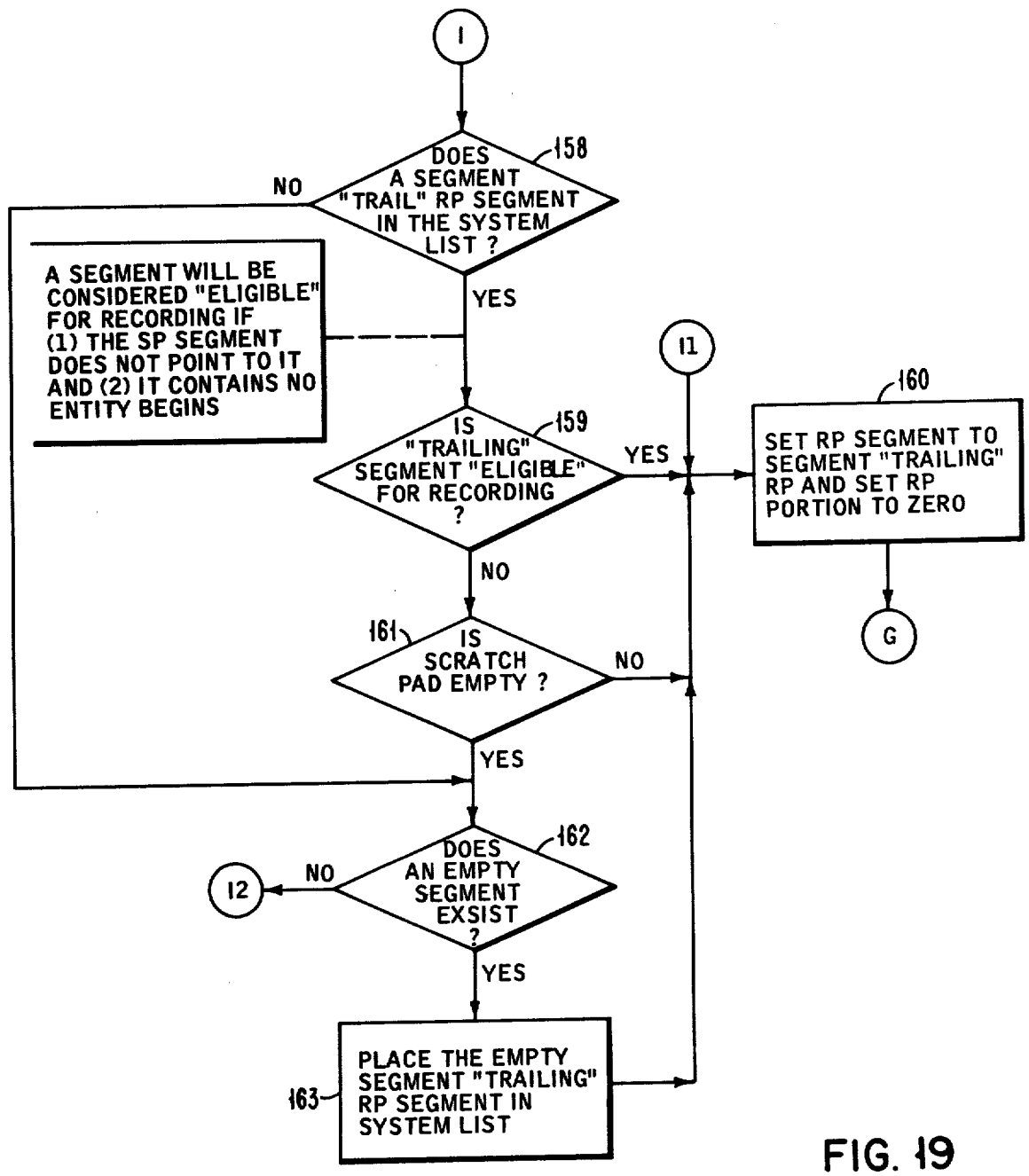

Referring back to FIG. 15, the operation from point I will now be discussed in which case another segment must be accessed for recording. Referring now to FIG. 19, at 158 the system list portion of the directory is scanned to determine whether a segment in the system list trails the segment pointed to by the segment field of the RP register. If a segment does trail, at 159 a determination is made as to whether the trailing segment is eligible for recording. The trailing segment will be considered to be eligible for recording if: (1) the segment portion of the SP register contents do not point to the trailing segment and (2) the trailing segment contains no entity begins. If the trailing segment is eligible, at 160, the segment portion of the RP register is set to the trailing segment number and the portion field of the RP register is set to zero. This will enable recording to continue from the beginning of this trailing segment in accordance with the operation starting at G, FIG. 15.

If the trailing segment is not eligible for recording, at 161 the SCRATCH PAD register contents are tested. If the scratch pad is not empty, an exception to not recording on an ineligible trailing segment is invoked at 160. At this point, the segment field of the RP register is set to the trailing segment and the portion field of the RP register is set to zero so that recording can proceed to G. This segment will be recorded upon since the scratch pad can be later linked if it is needed due to errors in recording in this trailing segment.

At 161, if the scratch pad is empty, the directory is interrogated at 162 to determine if an empty segment exists. If an empty segment does exist, the empty segment is linked into the system list trailing the current RP segment and the operation continues at 160, as described above. If an empty segment does not exist, the operation proceeds to I2, FIG. 20. Before leaving FIG. 19, it will also be noted that at 158, if a segment does not trail the RP segment in the system list, the operation jumps to 162 to determine whether or not an empty segment exists. This is the case in which the record pointer was pointing to the last segment in the system list.

Figure 20:
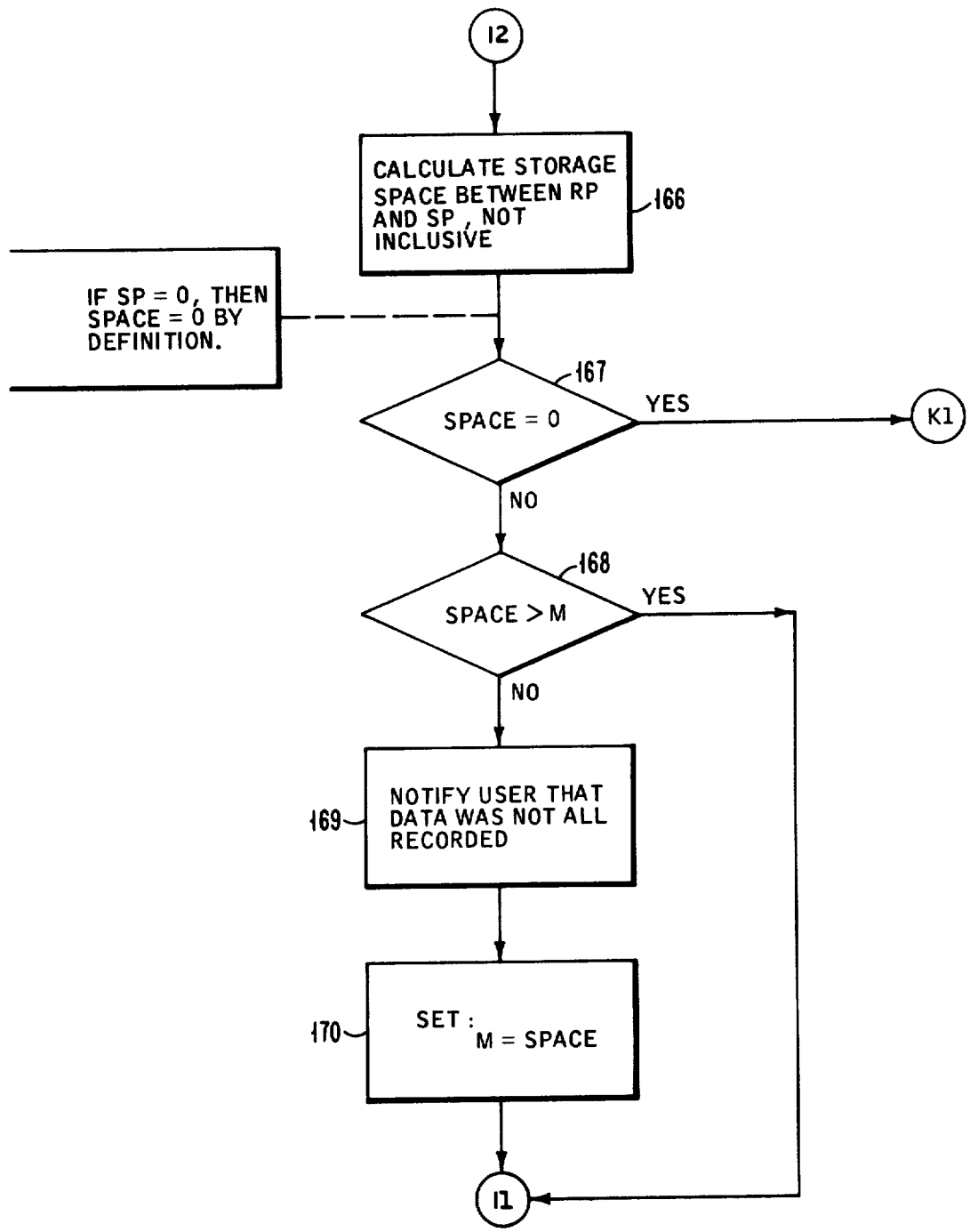

Referring now to I2, FIG. 20, at 166 the storage space between the record pointer and the select pointer, not inclusive, is calculated. If the select pointer is set to zero, then the amount of space equals zero by definition. At 167, if the amount of space equals zero, the operation proceeds to K1, FIG. 17. In this situation the user is notified that all data is not recorded and the operation proceeds to update the directory and re-record a directory onto storage 9. If the amount of space in storage 9 between the record pointer and the select pointer is greater than M, (the memory 21 contents) then the operation proceeds to I1, FIG. 19. From there the operation proceeds to 160, FIG. 19, as described above. In FIG. 20, at block 168, if the available space on storage 9 between the record pointer and the select pointer is less than the memory 21 contents, the user is notified that all data was not recorded at 169 and the operation proceeds to 170 where M is set equal to the calculated storage space. The operation then proceeds to I1, FIG. 19. In FIG. 19, the record pointer segment field is set to the trailing segment and the record pointer portion field is set to zero. The operation then proceeds to G, FIG. 15 for recording to continue from the record pointer toward the select pointer. The system halts recording before the record pointer overruns the select pointer.

In summary, therefore, a system and method are provided for storing and retrieving text entities and portions thereof for support of a text processing machine. These text entities, normally representing pages of a document, are stored as a series of unlabeled variable sized members on segments of a serial bulk storage device. The system attempts to maximize the unused system storage space by packing the entities onto the storage segment. The system directory, including both the system list and the system log, is resident in a random access memory of the system and is recorded on the segmented, serial storage device. The log is recorded on the storage device each time the storage device has data recorded onto it. To shorten access time during recording, and for reliability, the log is recorded in multiple locations, physically apart from each other on the storage device. The physically closest log is updated at each data storage operation. The log contains an "activity counter" which is increased at each update so that the most current, and therefore accurate log may be relocated during system initialization.

The system log maintains a record of storage portions having hard errors thereon so that no further use of these portions will be attempted. Additionally, a count of these faulty portions is maintained and the text processing system is notified when this count reaches a predetermined value.

In accessing a selected entity of data, the system relocates any data trailing the end of the selected entity that shares the segment on which the selected entity ends. This conflicting data is relocated prior to the initial reading of the requested entity and the relocation is done via the random access memory buffer which will ultimately hold the requested data. The data is relocated onto another storage segment which is not initially included in the system list. The relocated data will not be logged unless: (1) it is actually required after the originally requested, revised data has been stored back onto the storage, (2) or unless errors occur in attempting to store the requested data onto the segment from which it originally came, or (3) if the entity subsequent to the originally requested entity is also selected. If the data cannot be relocated, accessing of the requested entity will still be performed and the system will be notified of this special condition. The unlogged segment is called the scratch pad. Any data that cannot be read during the relocation is represented on the scratch pad by unique error codes. Thus, all entity begins are preserved during the relocation.

When the memory will not hold the entire requested entity, the partial entity select operation is used to transfer as many portions of an entity as there are corresponding whole integer portions in the text processing system memory, from the storage device to the memory, and to continue fetching the remainder of an entity to the text processing system memory when the memory has room to accept additional text.

Condensing of the segments is accomplished by alternate reading of an entity followed by recording of the entity with no other revision between reading and recording. This moves unused portions to build whole unused segments so that these unused segments may be deleted from the system list.

While the invention has been particularly shown and described with reference to a preferred embodiment thereof, it will be understood by those skilled in the art that various changes in form and details may be made therein without departing from the spirit and scope of the invention.

What is claimed is:

1. In a method of transferring a first randomly selected text entity between a serial storage device and a text processing system memory, wherein said memory is unable to contain all segment portions on which said entity is stored in said storage device, the improvement comprising:
   determining a capacity M of said memory, said M being an integer indicative of the current unfilled storage capacity of said memory in whole portions;
   transferrring M portions of said text entity into said text processing system memory; and
   inhibiting the transferring of unused-available portions and error-unusable portions physically located on said storage device between logically adjacent text portions of said entity.

2. The method of claim 1 further comprising:
   transferring additional portions of said first entity into said text processing system memory as additional storage space in said text processing system memory becomes available because of deletion of text previously stored in said memory.

3. The method of claim 1 further comprising transferring additional portions of said first entity into said text processing system memory as additional storage space in said text processing system memory becomes available by the recording of an entity out of said memory.

4. A method of condensing the storage of text on a number of segments of a serial storage device on which a series of text entities are stored thereon in portions of said segments, wherein unused-available portions are included on the segments between recorded portions of a text entity and between the end of one text entity and the beginning of another text entity, comprising:
   reading one or more entities from said storage device into the memory of a text processing system while automatically skipping said unused-available portions; and
   re-storing said one or more entities from said text processing system memory to said segments while automatically utilizing said unused-available portions for said re-storing.

5. A system for condensing the storage of text on a number of segments of a serial storage device on which a series of text entities are stored thereon in portions of said segments, wherein unused-available portions are included on the segments between recorded portions of a text entity and between the end of one text entity and the beginning of another text entity, comprising:
   means for reading one or more entities from said storage device into a text processing system memory, including means for skipping unused-available portions; and
   means for re-storing said one or more entities from said memory to said segments, including re-storing said entities on the unused-available portions of said segments.

6. A system for transferring a first randomly selected entity of text from a serial, segmented storage device to a text processing system memory, said segments of said storage device being divided into portions, comprising:
   means for determining the number of available whole storage space portions in said text processing memory;
   means for transferring the same number of portions of said first entity from said storage device to said memory;
   means, upon an indication from said determining means that an additional whole portion of memory space is available, for transferring an additional portion of said first entity to said memory; and
   said transferring means including means for inhibiting the transferring of unused-available portions and error-unusable portions physically located on said storage device between logically adjacent portions of said entity.

* * * * *